US007653735B2

(12) United States Patent
Mandato et al.

(10) Patent No.: US 7,653,735 B2
(45) Date of Patent: Jan. 26, 2010

(54) METHOD FOR ACHIEVING END-TO-END QUALITY OF SERVICE NEGOTIATIONS FOR DISTRIBUTED MULTI-MEDIA APPLICATIONS

(75) Inventors: Davide Mandato, Fellbach (DE); Andreas Kassler, Lauingen (DE)

(73) Assignee: Sony Deutschland GmbH, Cologne (DE)

( * ) Notice: Subject to any disclaimer, the term of this patent is extended or adjusted under 35 U.S.C. 154(b) by 1013 days.

(21) Appl. No.: 10/473,001

(22) PCT Filed: Mar. 11, 2002

(86) PCT No.: PCT/EP02/02663

§ 371 (c)(1), (2), (4) Date: Mar. 15, 2004

(87) PCT Pub. No.: WO02/078289

PCT Pub. Date: Oct. 3, 2002

(65) Prior Publication Data

US 2004/0139088 A1 Jul. 15, 2004

(30) Foreign Application Priority Data

Mar. 27, 2001 (EP) ................................. 01107626
Sep. 19, 2001 (EP) ................................. 01122366

(51) Int. Cl.
*G06F 15/16* (2006.01)
(52) U.S. Cl. ..................... 709/231; 709/205; 718/101
(58) Field of Classification Search ................. 709/205, 709/225, 228, 231, 248; 718/101
See application file for complete search history.

(56) References Cited

U.S. PATENT DOCUMENTS 5,745,480 A * 4/1998 Behtash et al. .............. 370/252

(Continued)

FOREIGN PATENT DOCUMENTS

EP 1 014 624 6/2000

(Continued)

OTHER PUBLICATIONS

Jari Koistinen, Worth-Based Multi-Category Quality-of-Service Negociation in Distributed Object Infrastructures,1998,Hewlett-Packard Laboratories (see IDS).*

(Continued)

*Primary Examiner*—Saleh Najjar
*Assistant Examiner*—Marie Georges Henry
(74) *Attorney, Agent, or Firm*—Oblon, Spivak, McClelland, Maier & Neustadt, L.L.P.

(57) ABSTRACT

This invention presents a framework for achieving dynamic End-to End QoS negotiation and control coordination, with distributed multimedia applications. The framework builds upon dynamic capability negotiations and specification of Adaptation Paths and (alternative) QoS Contracts, based on user preferences. In particular we present a protocol providing End-to-End negotiation of alternative QoS, capabilities, and preferences/configurations, based on extensions of IP-based protocols like SIP/RTSP/SDP, in coordination with mechanisms for network resource reservation (e.g. RSVP), local terminal resource (e.g. CPU, memory, power, auxiliary devices) reservation, and adaptation mechanisms. To this extent, and with respect to two or more peers (101, 103) this invention identifies six phases, through which said peers can establish multiparty, multi-stream, multimedia communications. In detail, the phases are: Protocol Discovery (104), Pre-Negotiation (106), Multi-Stream QoS Synchronization and QoS Correlation (107), Fast-Negotiation (obeying the Economy Principle) (108), Re-Negotiation (obeying the Economy Principle) (109), Resource Reservation Release (110). All the six phases can be concatenated, or be executed at different times. This invention also presents the concept of the E2ENP Broker (105), an optional third-party entity, which can be used for relieving peers (101, 103) from performing the time- and resource-consuming Pre-Negotiation phase (106) (and eventually also the Multi-Stream QoS Synchronization and QoS Correlation (107). This entity may coincide with e.g. audio-/videoconference bridges.

33 Claims, 6 Drawing Sheets

U.S. PATENT DOCUMENTS

| | | | | |
|---|---|---|---|---|
| 5,940,381 | A * | 8/1999 | Freeburg et al. | 370/331 |
| 6,240,091 | B1 * | 5/2001 | Ginzboorg et al. | 370/401 |
| 6,314,102 | B1 * | 11/2001 | Czerwiec et al. | 370/395.6 |
| 6,959,332 | B1 * | 10/2005 | Zavalkovsky et al. | 709/223 |
| 7,099,687 | B1 * | 8/2006 | Makela et al. | 455/552.1 |
| 7,133,368 | B2 * | 11/2006 | Zhang et al. | 370/249 |
| 7,447,763 | B2 * | 11/2008 | Brown et al. | 709/224 |

FOREIGN PATENT DOCUMENTS

| | | |
|---|---|---|
| WO | WO 99/33301 | 7/1999 |
| WO | WO 00/79756 | 12/2000 |

OTHER PUBLICATIONS

Koistinen J., Seetharaman A.: "Worth-Based Multi-Category Quality-of-Service Negotiation in Distributed Object Infrastructures" Jul. 1998, Hewlett Packard, HP Labs Technical Reports XP002207782, pp. 1-16.

Rothermel K et al: "QoS negotiation and resource reservation for distributed multimedia applications" Multimedia Computing and Systems '97. Proceedings., IEEE International Conference on Ottawa, Ont., Canada Jun. 3-6, 1997, Los Alamitos, CA, USA, IEEE Comput. Soc, US, Jun. 3, 1997, pp. 319-326, XP010239204.

Neureiter G et al: "The Brain quality of service architecture for adaptable services with mobility support" IEEE International Symposium on Personal, Indoor and Mobile Radio Communications, vol. 1, Sep. 18, 2000, pp. 445-450, XP002168301.

Beser, B., "Codec Capabilities Attribute for SDP", Mar. 2000, pp. 1-12, Internet Draft, Document: draft-beser-mmusiccapabilities-00.txt, Category: Informational, http://tools.iet.org/html/draft-beser-mmucic-capabliities-00.

Bhatti, Saleem N., et al., "Enabling QoS adaptation decisions for Internet applications", pp. 1-24, Computer Science Department, University College London, Gower Street, London WC1E 6BT, UK.

Blake, S. et al., "An Architecture for Differentiated Services", Dec. 1998, pp. 1-32, Network Working Group Request for Comments: 2475, Category: Informational, http://www.ietf.org/rfc/rfc2475.txt.

Borman, et al., "Simple Conference Control Protocol -- Service Specification draft-ietf-mmusic-sccp-01.txt", Feb. 13, 2001, pp. 1-25, Network Working Group, Internet Draft, http://tools.ieft.org/html/draft-ietfmmuisic-sccp-01.

Georg Neureiter, et al., "The Brain Quality of Service Architecture for Adaptable Services With Mobility Support", 2000 IEEE, pp. 445-450.

Gonzalo Camarillo, "Confirmation of SDP preconditions", Oct. 2000, pp. 1-8, Internet Engineering Task Force, Internet draft, http://tools.ietf.org/html/draft-camarillo-manyfolks-confirm-00.

Gonzalo Camarillo, "Third party call control with SDP preconditions", Jul. 2000, pp. 1-15, Internet Engineering Task Force, Internet draft, http://tools.ietf.org/html/draft-camarillo-3pcc-qos-00.

Graham Klyne, A revised media feature set matching algorithm <draft-klyne-conneg-feature-match-02.txt>, Apr. 6, 2000, pp. 1-21, IETF media feature registration WG, Internet draft, http://toolsietf.org/html/draft-klyne-conneg-feature-match-02.

Graham Klyne, Identifying composite media features <draft-leff-conneg-feature-hash-05.txt>, Jun. 8, 2000, pp. 1-20, IETFconneg working group, Internet draft, Category: Work-in-progress, http://tools.ietf.org/html/draft-ietf-conneg-feature-hash-05.

Svend Frolund, et al., "QML: A Language for Quality of Service Specification", Feb. 1988, pp. 1-63, Software Technology Laboratory, HPL-98-10, Hewlett-Packard Company.

M. Handley, et al., "Packetizer - RFC 2327-SDP: Session Description Protocol", Apr. 1998, pp. 1 30, Network Working Group Request for Comments: 2327, http://www.packetizer.com/rfc/rfc2327/.

M. Handley, et al., "SIP: Session Initiation Protocol", Mar. 1999, pp. 1-134, Network Working Group Request for Comments: 2543, Category: Standards Track, http://www.org/rfc/rfc2543.txt.

M. Handley, et al., "Session Announcement Comments: 2974, Category: Experimental, Protocol", Oct. 2000, pp. 1-16, Network Working Group Request for Comments: 2974, Category: Experimental, http://www.ietf.org/rfc/rfc2974.txt.

ITU International Telecommunication Union, "ITU-T X.641 Series X: Data Networks and Open System Communication - OSI networking and system aspects - Quality of Service", Dec. 1997, pp. 1-56, ITU-T Rec.X.641.

Andreas Kassler, et al., An End-to-End Quality of Service Management Architecture for Wireless ATM Networks, 1999 IEEE, pp. 1-10, Proceedings of the $32^{nd}$ Hawaii International Conference on System Sciences.

Andreas Kassler, et al., "BRENTA - Supporting Mobility and Quality of Service for Adaptable Multimedia Communication", 1999, pp. 403-408.

Andreas Kassler, "An Open Endsystem Architecture for Adaptable Multimedia Services with QoS Support", Nov. 20, 2000, pp. 1-19, Brain Workshop 2000.

0. Levin, "SIP Requirements for support of Multimedia and Video", Feb. 22, 2001, pp. 1-9, Internet Engineering task Force, Internet Draft, draft-levin-sip-for-video-00.txt, RADvision Inc., http://tools.ietf.org/html/draft-levin-sip-for-video-00.

W. Marshall, et al., "Integration of Resource Management and SIP", Nov. 2000, pp. 1-25, SIP Working Group, http://tools.ietf.org/html/draft-ietf-sip-manyfolks-resource-00.

Klara Nahrstedt, et al., "The QoS Broker", 1995, pp. 1-29, IEEE Multimedia Magazine.

J. Ott, et al., "Capability description for group cooperation draft-ott-mmusic-cap-00.txt", Jun. 1999, pp. 1-25, Internet-Draft, http://tools.ietf.org/html/draft-ott-mmusic-cap-00.

Ping Pau, et al., "YESSIR: A Simple Reservation Mechanism for the Internet", pp. 89-101, ACM SIGCOMM, Computer Communication Review.

G. Klyne, "A Syntax for Describing Media Feature Sets", Mar. 1999, pp. 1-33, Network Working Group Request for Comments: 2533, Category: Standards Track, http://www.isi.edu/in-notes/rfc2533.txt.

G. Klyne, "Protocol-independent Content Negotiation Framework", Sep. 1999, pp. 1-18, Network Working Group Request for Comments: 2703, Category: Informational,.

W. Marshall, et al., "Integration of Resource Management and SIP", Feb. 2001, pp. 1-28, SIP Working Group, Internet Draft http://tools.ietf.org/html/draft-ietf-sip-manyfolks-resource-01.

F. Andreasen, "SDP Simple Capability Negotiation", Nov. 2000, pp. 1-8, Cisco Systems, MMUSIC Working Group, Internet-Draft, Category: Informational, http://tools.ieft.org/html/draft-andreasen-mmusic-sdp-simpcap-00.

F. Andreasen, "SDP Simple Capability Negotiation Requirements", Feb. 2001, pp. 1-7, Cisco Systems, MMUSIC Working Group, Internet-Draft, Category: Informational, http://tools.ietf.org/html/draft-andreasen-mmusic-sdp-simpcap-reqts-00.

Kutscher, et al., "Requirements for Session Description and Capability Negotiation draft-kutscher-mmusic-sdpng-req-01.txt", Nov. 24, 2000, pp. 1-26, Network Working Group, Internet-Drafts, http://tools.ietf.org/html/draft-kutschermmusic -sdpng-req-01.

H. Schulzrinne, et al., "Real Time Streaming Protocol (RTSP)", Apr. 1998, pp. 1-81, Network Working Group, Request for Comments: 2326, Category: Standards Track, http://www/ietf.org/rfc/rfc2326.txt.

Stephen Bugaj, et al., "Synchronized Multimedia Integration Language (SMIL) 1.0 Specification", W3C Recommendation Jun. 15, 1998, pp. 1-39, http://www.w3.org/TR/REC-smil/.

* cited by examiner

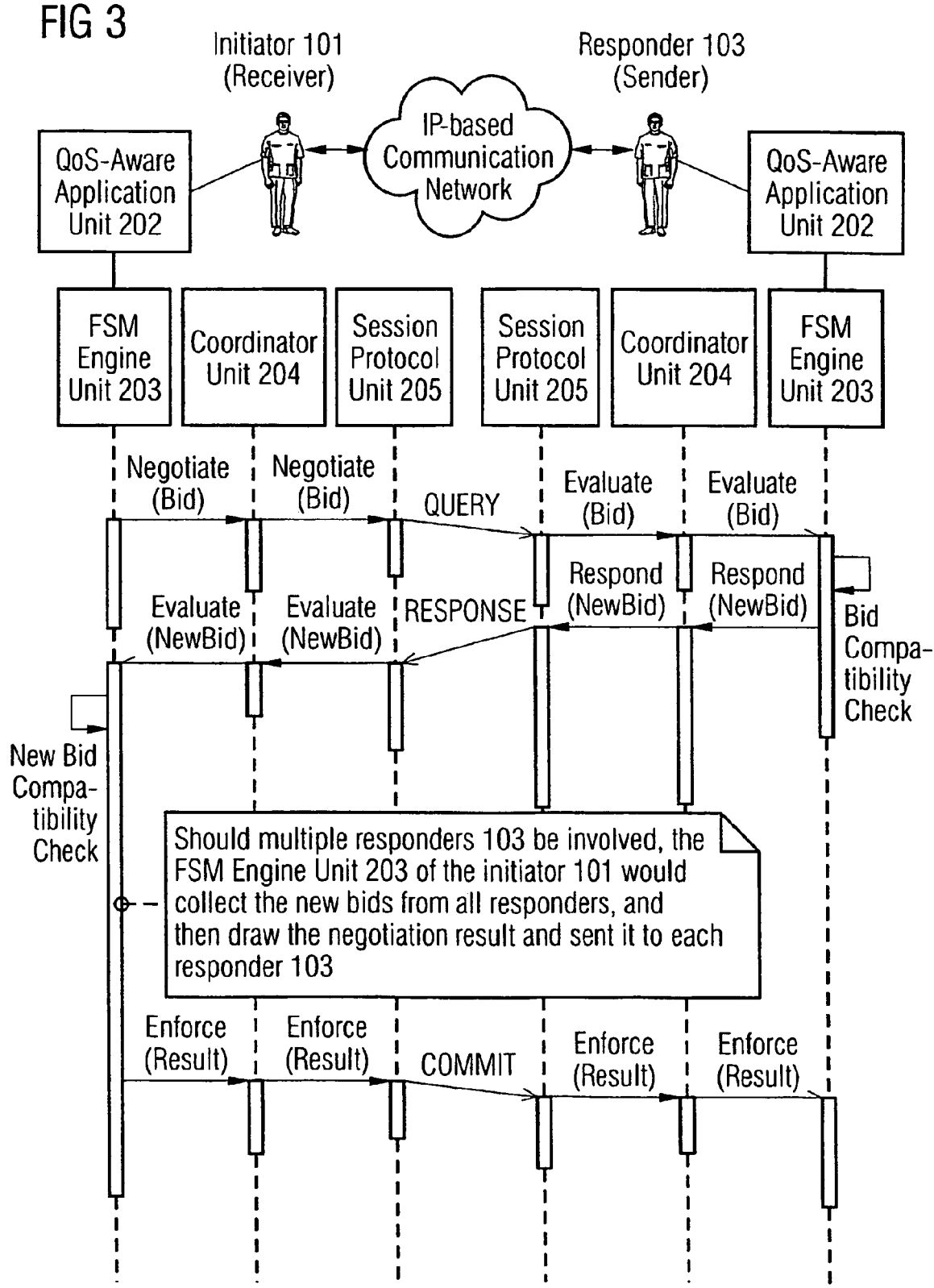

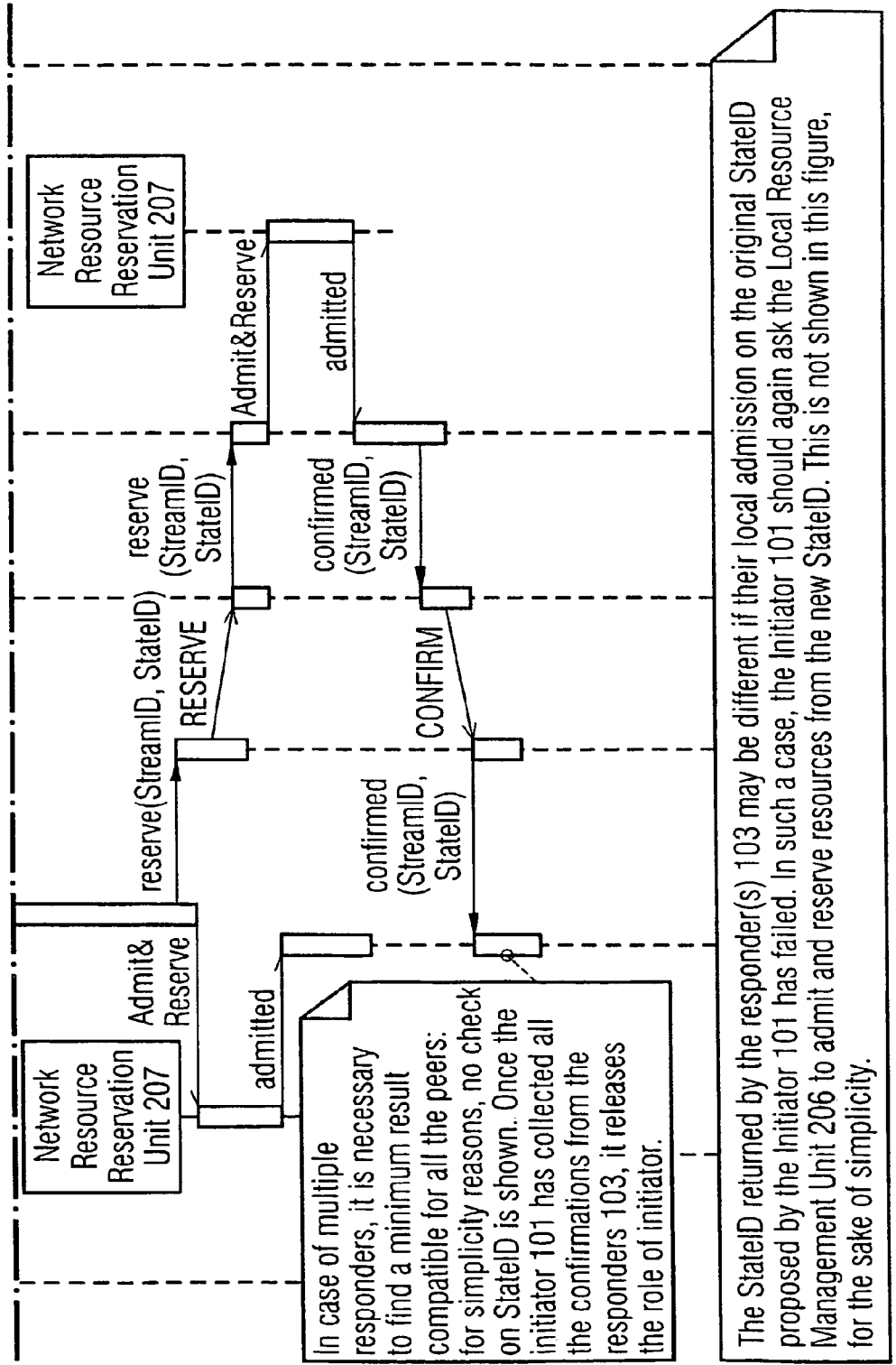

METHOD FOR ACHIEVING END-TO-END QUALITY OF SERVICE NEGOTIATIONS FOR DISTRIBUTED MULTI-MEDIA APPLICATIONS

The invention hereby presented generally relates to the field of distributed multimedia applications and technologies. It includes research and development issues related especially to multimedia middleware, Quality of Service (QoS) Management, Resource Reservation mechanisms, mobile terminals, and wireless communication.

At first the terminology used in the present description and the claims will be shortly explained:

| Term | Definition |
| --- | --- |
| Adaptation Path | An ordered set of QoS contracts that indicate the users preferences and wishes. Typically, the most important QoS contract is the first one in the path. |
| Component | A particular type of interaction (e.g. audio conversation) that can be realized using different applications |
| Configuration | A set of parameters required for implementing a variation of a certain component. Potential configuration indicates the system's functional capabilities, whereas actual configurations reflect the mode of operation of a particular instantiation. |
| Content negotiation | Exchange of information leading to select proper representation when transferring data |
| Economy Principle | The economy principle suggests to reserve the more expensive resources as the last ones. As network resources are shared among several clients and typically one has to pay for them, it is better to first reserve resources on all end systems and then resource network resources as the last step. |
| Feature set | Some sets of media features described by a media feature assertion |
| Quality of Service, QoS | The collective effect of service performance which determines the degree of satisfaction of a user of the service[1] |
| QoS Change | The change of the QoS contract initiated by the service user |
| QoS Contract | Agreement between a service user and a given service provider, specifying QoS requirements and constraints, as well as the policies required to keep track about QoS during all phases of said service. |
| QoS Contract Type | Captures the structure of a class of QoS Contracts, by identifying how individual QoS Contracts specify the QoS properties over a given set of QoS parameter types (also known as dimensions in [Frolu98]). Each parameter type consists of a name and a domain of values. QoS specifications can be simply intended as a set of constraints over said domains, one per parameter type. |
| QoS Specification | General term for identifying set of QoS parameters and constraints specified by a user. |
| QoS Violation | The violation of a QoS Contract caused by the Service Provider |
| Third party call control | In third party call control, an external controller is creating, modifying and terminating sessions between other participants. |

[1]Definition from the ITU-T (former CCITT) Recommendation E.800

Now the abbreviations used in the description will be explained:

| | |
| --- | --- |
| ATM | Asynchronous Transfer Mode |
| CC/PP | Composite Capabilities/Preference Profiles |
| CSCW | Computer-Supported Cooperative Work |
| E2ENP | End-to-End Negotiation Protocol |
| HDTV | High Definition Television |
| HTTP | Hyper Text Transport Protocol |
| IETF | Internet Engineering Task Force |
| IP | Internet Protocol |
| IRT | Initiator-Role-Token |
| MSC | Message Sequence Charts |
| OS | Operating System |
| RDF | Resource Description Framework |
| RTP | Real Time Protocol |
| RTSP | Real Time Streaming Protocol |
| RSVP | Resource Reservation Protocol |
| SAP | Session Announcement Protocol |
| SDP | Session Description Protocol |
| SIP | Session Initiation Protocol |
| VoD | Video on Demand |
| UML | Unified Modeling Language |
| XML | Extended Markup Language |

The following prior art documents are known to the inventors:

[Beser00] B. Beser, *Codec Capabilities Attribute for SDP*, IETF Internet-Draft, Work-in-progress, <draft-beser-mmusic-capabilities-00.txt>.

[Bhatt99] S. Bhatti, G. Knight, *Enabling QoS adaptation decisions for Internet applications*, London, UK, 1999.

[Blake98] S. Blake, D. Black, M. Carlson, E. Davies, Z. Wang, W. Weiss, *An Architecture for Differentiated Services*, IETF Request for Comments: 2475, December 1998.

[Booch99] G. Booch, J. Rumbaugh, I. Jacobson, *The Unified Modeling Language User Guide*, Addison Wesley Longman, 1999.

[Bor00] C. Bormann et. al., *Simple Conference Control Protocol*, IETF Internet-Draft, Work-in-progress, <draft-ietf-mmusic-sccp-01.txt>.

[Burn00] L. Burness et al., *The BRAIN Quality of Service Architecture for Adaptable Services with Mobility Support*, in Proceedings of the PIMRC 2000, London, 2000.

[Cama00] G. Camarillo, *Confirmation of SDP preconditions*, IETF Internet Draft, Work-in-progress, <draft-camarillo-manyfolks-confirm-02.txt>.

[Cama00a] G. Camarillo, *Third party call control with SDP preconditions*, IETF Internet Draft, Work-in-progress, <draft-camarillo-3pcc-qos-00.txt>.

[Conneg00] G. Klyne (ed.), *A revided media feature set matching algorithm*, IETF media feature registration WG, Work-in-progress, <draft-klyne-conneg-feature-match-02.txt>.

[Conneg00a] G. Klyne (ed.), *Identifying composite media features*, IETF conneg working group, Work-in-progress, <draft-ietf-conneg-feature-hash-05.txt>.

[Frolu98] S. Frolund, J. Koistinien, *QML: A Language for Quality of Service Specification*, HP-Lab Technical Reports, HPL-98-10, 980210.

[Handl98] M. Handley, V. Jacobson, *SDP: Session Description Protocol*, IETF Request for Comments: 2327, April 1998.

[Handl99]M. Handley, H. Schulzrinne, E. Schooler, J. Rosenberg, *SIP: Session Initiation Protocol*, IETF Request for Comments: 2543, March 1999.

[Handl00] M. Handley, C. Perkins, E. Whelan, *Session Announcement Protocol*, IETF Request for Comments: 2974, October 2000.

[ISOX641] ITU-T Recommendation X.641 (December/1997) |ISO/IEC 13236:1998, *Information technology—Quality of Service: Framework*.

[Kassl99a] A. Kassler, P. Schulthess, *An End-to-End Quality of Service Management Architecture for Wireless ATM networks*, in: Proceedings of the HICSS 32, Mauii, Hi., USA, January 1999.

[Kassl99b] A. Kassler, P. Schulthess, *Extending the QoS Paradigm of Wireless ATM to Mobile Broadband Applications and to the User*, in: Proceedings of the WCNC '99, September 1999, New Orleans, USA.

[Kassl00] A. Kassler et al., BRENTA—*Supporting Mobility and Quality of Service for Adaptable Multimedia Communication*, in Proceedings of the IST Mobile Communications Summit 2000, Galway, Ireland, October 2000, pp. 403-408.

[Kassl00a] A. Kassler et al., *An Open Endsystem Architecture for Adaptable Multimedia Services with QoS Support*, in Proceedings of the BRAIN workshop, London, 2000.

[Levin01] O. Levin, *SIP Requirements for support of Multimedia and Video*, IETF Internet-Draft, Work-in-progress, <draft-levin-sip-for-video-00.txt>

[Manda00a] D. Mandato, *A universal QoS adaptation framework for mobile multimedia applications*, European Patent Application 00 111 191.3, May 24, 2000.

[Manda00b] D. Mandato et at, *High-Level interface for QoS-based mobile multimedia applications*, European Patent Application 00 126 975.2, Dec. 8, 2000.

[Marsh00] W. Marshall et al., *SIP Extensions for Resource Management*, IETF draft <draft-ietf-sip-manyfolks-resource-00>, November 2000.

[Nahr95] K. Nahrstedt and J. M. Smith, *The QoS Broker IEEE*, Multimedia Magazine, Spring 1995 (2)1, pp. 53-67

[Ott99] J. Ott et. al., *Capability description for group cooperation*, IFTF Internet-Draft, Work-in-progress, <draft-ott-mmusic-cap-00.txt>.

[Pan99] P. Pan, H. Schulzrinne, *YESSIR: A Simple Reservation Mechanism for the Internet*, Computer Communications Review (CCR), Vol. 29, No. 2, pp. 89-101, April 1999.

[Pasqu92] J. Pasquale, G. Polyzos, E. Anderson, V. Kompella, *The Multimedia Multicast Channel*, Proc. of 3rd International Workshop on Network and Operating System Support for Digital Audio and Video (NOSSDAV 92), San Diego, Calif., November 1992, pp. 185-192.

[Pasqu93] J. Pasquale et al., *Filter Propagation in Dissemination Trees: Trading Off Bandwidth and Processing in Continuous Media Networks*, Proc. of NOSSDAV 93, Lancaster University, Lancaster, UK, 1993, pp. 269-278.

[RFC2533] RFC 2533, *A Syntax for Describing Media Feature Sets*, Graham Klyne, 5 GM/Content Technologies, March 1999.

[RFC2703] RFC 2703, *Protocol-independent Content Negotiation Framework*, Graham Klyne, 5 GM/Content Technologies, September 1999.

[SIPRES01] W. Marshall et. al., *Integration of Resource Management and SIP—SIP Extensions for Resource Management*, IETF SIP working group, Work-in-progress, <draft-ietf-sip-manyfolks-resource-01.txt>.

(SDPCN00) F. Andreasen, *SDP Simple Capability Negotiation*, IETF MMUSIC working group, Work-in-progress, <draft-andreasen-mmusic-sdp-simcap-00.txt>.

[SDPCN01] F. Andreasen, *SDP Simple Capability Negotiation Requirements*, IETF MMUSIC working group, Work-in-progress, <draft-andreasen-mmusic-sdp-simcap-reqts-00.txt>.

[SDPNG00] D. Kutscher et. al., *Requirements for Session Description and Capability Negotiation*, IETF Internet-Draft, Work-in-progress, <draft-kutscher-mmusic-sdpng-req-01—.txt>.

[Shulz98] H. Schulzrinne, A. Rao, R. Lanphier, "*Real Time Streaming Protocol (RTSP)*", IETF Request for Comments: 2326, April 1998.

[SIPRES01] W. Marshall et. al., *Integration of Resource Management and SIP—SIP Extensions for Resource Management*, IETF SIP working group, Work-in-progress, <draft-ietf-sip-manyfolks-resource-01.txt>.

[SMIL98] *Synchronized Multimedia Integration Language (SMIL) 1.0 Specification*, W3C Recommendation, Jun. 15, 1998.

[Yeado93] N. Yeadon, F. Garcia, D. Hutchinson, D. Shepherd, Filters: *QoS Support Mechanisms for Multipeer Communications*, IEEE Journal on Selected Areas in Communications, Vol. 14, No., 7, September 1993.

The relevant prior art documents will now be acknowledged shortly:

In W. Marshall et. al.: *Integration of Resource Management and SIP-SIP Extensions for Resource Management*, IETF SIP working group, Work-in-progress, <draft-ietf-sip-manyfolks-resource-01.txt>, the authors present a multi-phase call-setup mechanism that makes network QoS and security establishment a precondition to sessions initiated by the Session Initiation Protocol (SIP) and described by the Session Description Protocol (SDP). Network resources are reserved before the session is started using existing network resource reservation mechanisms (like RSVP). The resource management protocol is interleaved between two phases of call signaling and participants are invited after resources are available in the network. A confirmation of the preconditions is explicitly signaled. Resource management is done only for the network resources. An extension to SDP is introduced to determine whether the preconditions are met.

In G. Camarillo: *Confirmation of SDP preconditions*, IETF Internet Draft, Work-in-progress, <draft-camarillo-manyfolks-confirm-02.txt>, an additional direction attribute is introduced to indicate which party sends the confirmation of the preconditions. Finally, G. Camarillo: *Confirmation of SDP preconditions*, IETF Internet Draft, Work-in-progress, <draft-camarillo-manyfolks-confirm-02.txt>provides a mechanism to perform third party call control in SIP when SDP preconditions are used.

In RFC 2533, *A Syntax for Describing Media Feature Sets*, Graham Klyne, 5GM/Content Technologies, March 1999 the authors present a format to express media feature sets that represent media handling capabilities. In addition, an algorithm is provided that matches the feature sets. It might be used to determine if the capabilities of a sender and receiver are compatible.

This matching algorithm is improved in G. Klyne (ed.): *A revised media feature set matching algorithm*, IETF media feature registration WG, Work-in-progress, <draft-klyne-conneg-feature-match-02.txt>.

In addition, G. Klyne (ed.): *Identifying composite media features*, IETF conneg working group, Work-in-progress, <draft-ietf-conneg-feature-hash-05.txt> describes an abbreviated format for composite media feature sets that uses a hash of the feature representation to describe the composite. This can be used to provide an abbreviated form for referencing an arbitrary feature set expression, independent of any particular mechanism for dereferencing. In F. Andreasen, *SDP Simple Capability Negotiation Requirements*, IETF MMUSIC working group, Work-in-progress, <draft-andreasen-mmusic-sdp-simcap-reqts-00.txt> the authors state the requirement that a capability set should contain a handle (similar to the hash mentioned above) allowing for easy referencing of the capability set.

In RFC 2703, *Protocol-independent Content Negotiation Framework*, Graham Klyne, 5 GM/Content Technologies, September 1999 the authors present an abstract framework for protocol independent content negotiation for the resources with which it interacts. It does however not provide the content negotiation process. It identifies the need for expressing the capabilities of the sender and the data resource to be transmitted, the capabilities of the receiver and the need for a protocol to exchange these capabilities. Negotiation is carried out by a series of negotiation metadata exchanges. Negotiation stops, if a specific data file has been found to be transmitted. The sender transfers the data if the sender determines the file, otherwise the receiver informs the sender. This proposal therefore relates to content negotiation.

Work going on in D. Kutscher et. al.: *Requirements for Session Description and Capability Negotiation*, IETF Internet-Draft, Work-in-progress, <draft-kutscher-mmusic-sdpng-req-01.txt> identifies the requirements of a framework dealing with session description and endpoint capability negotiation in multiparty multimedia conferencing scenarios. Depending on user preferences, system capabilities or other constraints, different configurations can be chosen for the conference. The need of a negotiation process among the peers is identified, but not described, in order to determine a common set of potential configurations and to select one of the common configurations to be used for information exchange. This capability negotiation is used to get a valid session description compatible with the end system capabilities and user preferences of the potential participants. Different negotiation policies may be used to reflect different conference types. They also identify the need for network resource reservation coupled with session setup. Finally a proposal is drafted for describing capabilities and providing the negotiation language but not a protocol.

The authors of F. Andreasen, SDP Simple Capability Negotiation, IETF MMUSIC working group, Work-in-progress, <draft-andreasen-mmusic-sdp-simcap-00.txt> propose a set of SDP extensions providing a minimal and backward compatible capability negotiation mechanism. In B. Beser: *Codec Capabilities Attribute for SDP*, IETF Internet-Draft, Work-in-progress, <draft-beser-mmusic-capabilities-00.txt> the author extends SDP so that end-points know the codec choices and can agree on a common set. The communication partner can thus obtain the originators capabilities and preferences. In J. Ott et. al.: *Capability description for group cooperation*, IETF Internet-Draft, Work-in-progress, <draft-ott-mmusic-cap-00.txt> a notation for describing potential and specific configurations of end systems in multiparty collaboration sessions is given. This enables mechanisms to define end system capabilities, calculate a set of common capabilities and to express a selected media description for use in session descriptions. They do not provide a protocol for capability exchange. In C. Bormann et. al.: *Simple Conference Control Protocol*, IETF Internet-Draft, Work-in-progress, <draft-ietf-mmusic-sccp-01.txt> the authors define services for a simple conference control protocol (SCCP) for tightly coupled conferences. Member management, application/session management and access control rules for distributed application resources are defined. The conference's state, which might be established using SIP, is managed during the lifetime using SCCP. This includes the finding of appropriate configurations, negotiating for configurations and changing the configuration. However, no interaction with local resource management is intended.

The authors of K. Nahrstedt and J. M. Smith: *The QoS Broker*, IEEE Multimedia Magazine, Spring 1995 (2)1, pp. 53-67 presented a model for an end-point architecture based on a QoS Broker, which is a functional entity that orchestrates resources at the end-points and coordinates resource management across layers. In order to configure the system properly, the broker uses admission control and negotiation. Negotiation among peer entities leads to a valid configuration, which involves all necessary components of the communication system.

In the present document the term economy principle is used to describe the order of reservation described in K. Nahrstedt and J. M. Smith: *The QoS Broker*, IEEE Multimedia Magazine, Spring 1995 (2)1, pp. 53-67:

First, local resources are reserved.

Then negotiation with the peer entity leads to a configuration that can be mapped to resource requirements at the peer, which are then reserved.

Finally, reservation of network resources is done in the last step, because network resources are expensive and shared among multiple users.

The authors of O. Levin, *SIP Requirements for support of Multimedia and Video*, IETF Internet-Draft, Work-in-progress, <draft-levin-sip-for-video-00.txt> present a set of requirements for a call-control protocol for real-time multimedia support over IP. Capabilities have to be expressed, capabilities have to be signaled to identify the amount of resources that are necessary, and a call control mechanisms is needed to open/close/modify media streams within the boundaries set forth by capabilities and reserved resources. Also they propose to announce new capabilities (if available) during a session. In addition, the peers have to agree on a common set of codecs to be used. A session control mechanism to start/stop the streams is put as a requirement.

In Burness L. et al., *The BRAIN Quality of Service Architecture for Adaptable Services with Mobility Support*, in Proceedings of the PIMRC 2000, London, 2000; Kassler A. et al., BRENTA—*Supporting Mobility and Quality of Service for Adaptable Multimedia Communication*, in Proceedings of the IST Mobile Communications Summit 2000, Galway, Ireland, October 2000, pp. 403-408; and Kassler A. et al., *An Open Endsystem Architecture for Adaptable Multimedia Services with QoS Support*, in Proceedings of the BRAIN workshop, London, 2000, an end-system architecture is presented that integrates local, peer and network resource reservation into a framework for end-to-end QoS management. User Preferences and adaptation paths are used together with QoS states to negotiate QoS at application level. Interaction with local resource management is introduced. The layered architecture provides support for different types of applications.

The basic idea of extending existing session protocol layers, like SIP, for pre-negotiating Adaptation Paths at multiple levels of stream aggregations, is contained in European Patent Application 00 126 975.2, Dec. 8, 2000. However, this European patent application does not detail a full-fledged End-to-End QoS Negotiation Protocol, and does not integrate admission control and resource reservation aspects.

In the European Patent Application 00 111 191.3, May 24, 2000, a data model detailing ways to achieve QoS synchronization and QoS correlation among multiple multimedia streams is presented. Such data model refines the concepts presented in the aforementioned European Patent Application 00 126 975.2. Such a data model, however, does not cover the description of capability like codecs.

PROBLEM TO BE SOLVED BY THE INVENTION

In [Levin01], the author states on page 2: "(. . .) establishing a session of a certain quality, based on capabilities agreement during the session establishment and sustained throughout the duration of the session. The problem can be described as a lack of expressiveness in three following areas: capabilities specification, resource reservation and media stream control.

The desired ultimate goal is
to express the capabilities (i.e. supported media, CODEC algorithms, bandwidth, etc.) without a need in configuration,
to signal the total resources required for a specific session (probably in terms of capabilities, and
within a session, to explicitly open and close media streams and to modify the parameters of a certain stream within the boundaries of previously announced capabilities and reserved resources."

The author also states on page 4: "SIP extensions may be needed to separate the 'capabilities announcement' phase from the actual opening of media streams."

In view of the prior art it is the objective of the present invention to propose a concept providing QoS guarantees in an effective manner.

This objective is achieved my means of the features of the independent claims. The dependent claims develop further the central idea of the present invention.

Further features, objects and advantages of the present invention will now be explained with reference to the figures of the enclosed drawings:

FIG. 3 shows an example of a pre-negotiation phase 106 (MSC)

Figure 1:
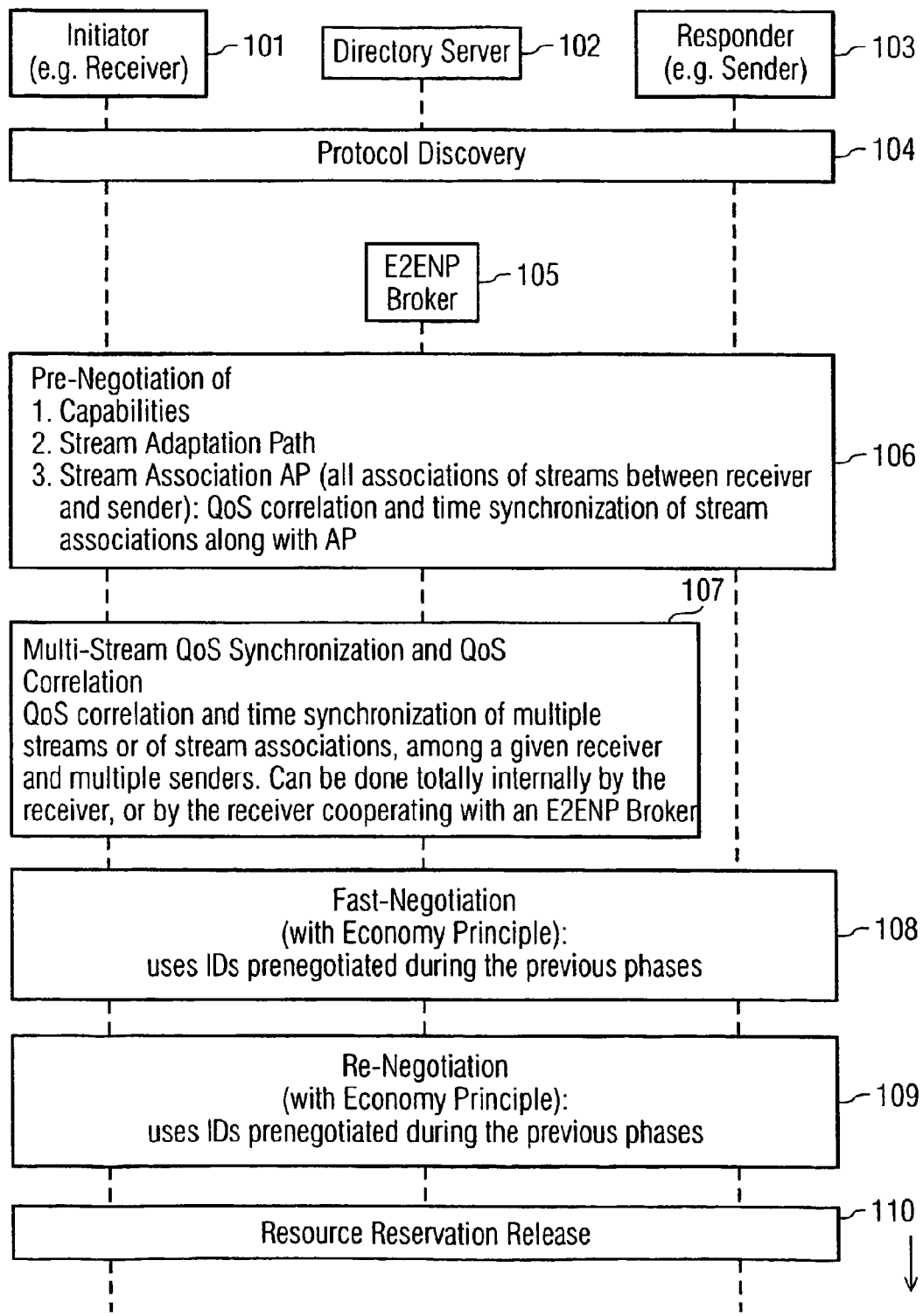
FIG. 1 shows high-level MSC identifying phases.

Following are those requirements which can be of importance for providing QoS guarantees in an effective manner:

Provision of a comprehensive set of mechanisms and protocols, linking together several aspects like:
1. Pre-Negotiation, which also can be done offline and published using e.g. LDAP
2. Negotiation integrated with ad-hoc reservation
2.1 Economy principle
2.2 Coordination of resource reservation, enhanced with the features listed below Specific description of the interaction with local and peer resource management (some protocol procedures are required to this extent)

Use of state IDs to construct and reference an Adaptation Path

Explicit mention to hierarchical state machines for Adaptation Path at different levels One of the targets the invention is aiming at is the support of various types of services:
Conversational services
Distribution services
Information retrieval services The concept proposed by the present invention can be adapted to these different types of services. The reason being that, depending on the type of service, different sequences of actions may be required for the interaction between reserving network and end system resources, which also depends on the communication mode of each peer (sender/receiver).

For instance, questions need to be addressed, like whether a receiver needs to wait to be contacted by a sender, or who initiates resource reservation on the network (the sender or the receiver). The answers to these questions depend on the type of service.

The Concept of an End-to-End Negotiation Protocol (E2ENP)

The establishment of a QoS-enabled communication session can be accomplished in a multi-step process, starting with negotiation of QoS aspects on an end-to-end basis. The idea hereby proposed is to have peers negotiating beforehand (i.e. before the actual communication takes place) a common level of QoS, the use of which peers can agree upon. This is a form of pre-negotiation of a vocabulary which peers can use later on for efficiently dealing with contingent negotiations (e.g. when establishing audio/video streams) or re-negotiations (changing the QoS Contract during ongoing sessions). The benefit of this approach is that the time necessary for re-negotiation is reduced because the peers have only to refer to a negotiated state instead of performing a full negotiation cycle during streaming. Furthermore, the type of negotiation can be tailored based on capabilities that are currently available at all peers.

The identified steps are:
1. Pre-negotiation of a set of QoS contracts with the peers. Such set describes an Adaptation Path for a generic stream of a given type (e.g. audio, video, or data streams).
2. As an intermediate step, peers negotiate QoS correlation and synchronization aspects among multiple streams. This might not be necessary if a session contains only one stream: in that case QoS correlation would be simply ignored. Thus this step builds up the session concept. Note that, in case peers have to coordinate several streams, QoS correlation and synchronization issues would be handled at runtime by triggering specific coordination function (based on e.g. RTP), which are derived from the negotiated QoS states.
3. As a last step, peers negotiate QoS Contracts on a per stream basis at stream establishment time, based on the pre-negotiated vocabulary established during step (1). At this step, actual admission control is performed. To this extent, according to one aspect of the present invention it is proposed to follow an economy principle observing the fact that network resources have to be shared and are more expensive than local resources. The hereby proposed process is based on the steps in the following order:
   3.1 Local resources (i.e. resources managed by the local system) like CPU, memory, and power are reserved on the terminal device of the party initiating the communication (i.e. the initiator). These are the cheapest resources, since they are used exclusively by the initiator. The amount of resources that are reserved by the initiating party corresponds to the quality the initiator is most interested in and can cope with.
   3.2 Remote resources like CPU, memory, and power are reserved on the terminal device of the party accepting the request to establish the communication (i.e. the responder). These resources may be eventually shared by a plurality of initiators with respect to multiple telecommunication sessions, like in the case of a Video-on-Demand scenario (where the responder is the video server, which needs to serve multiple requests from multiple users). It does not make sense to try to reserve these shared resources (thus affecting other communication sessions at the responder) prior of having ascertained the availability of resources at the initiator side.
   3.3 Only when both the local and remote resources have been successfully reserved, network resources are reserved which are shared (by definition) by a plurality of parties and therefore to this extent can be considered as the most expensive resources at all.

4. This invention describes a protocol procedure for informing peers about changes in capability configuration (e.g. the installation or removal of a given multimedia codec) of a given participant of the given communication session. By pro-actively disseminating this information among peers, proper actions can be taken with respect to any currently active communication session, and to all the negotiation processes concerning future attempts-to-establish-communication sessions.

Steps (2) and (3) (or $(1)^2$, (2), and (3)) can be treated jointly as one-shot[3] or separately as a sequence of actions[4].

[2] In such a case, pre-negotiations might be no longer valid, should a new party join a session with a different understanding what an adaptation path is with respect to the already negotiated on.
[3] As an example, negotiation and set up of a session with two audio- and three video-streams, simultaneously
[4] Carry out the pre-negotiation first, then start with the first stream, add then the second stream, and so on.

Note that in certain cases only steps (3.1), (3.2) and (3.3) might be necessary. As an example this can be the case if everything is pre-negotiated by default (using fixed settings) and only one quality and configuration of a video stream is located on a server.

A key aspect of the E2ENP is that it can be used not only in conjunction with network resource reservation signaling protocols, but also with other types of QoS architectures. In the latter case, pre-negotiation will focus on having peers agreeing on the types of QoS classes to use, with respect to the capabilities of each peer.

What to Negotiate

This section focuses on (i) what type of information (ii) under which circumstances needs to be negotiated.

More specifically, peers should agree on:
which E2ENP (or other protocol) to use;
which capabilities and configurations are available and applicable;
what QoS contracts are applicable and form the Adaptation Path; and
the Adaptation Paths themselves.

Types of Supported E2ENP

Most of the state of the art applications will not be able to employ the hereby-described E2ENP without any specific retrofitting. Rather they will eventually apply some other form of state of art negotiation mechanism. It is reasonable to assume also that some future applications may eventually only partially support the E2ENP, or just different versions thereof.

For these reasons, the first type of information that needs to be negotiated is the type and version of supported "E2ENP".

This might be accomplished by using a directory server. As an example, a directory entry associated with a given peer, and named E2ENP would act as a token indicating that the given peer supports the E2ENP. The directory entry could look like:

E2ENP = (type of service, protocol to be used, version)

where "type of service" could indicate information retrieval service or conversational service, "protocol" could indicate SIP. (together with SDP) or H.323 or RTSP (i.e. which protocol is the given E2ENP based upon), and "version" could be a number discriminating incremental sets of functionality. In addition to the aforementioned protocols, specific extensions are needed to carry out the negotiation and describe the Adaptation Path.

As an example, the E2ENP can be mapped—based on the type of service—to the following protocols:

| Type of Service | Protocols |
|---|---|
| Conversational services | SIP(together with SDP)/H.323 + enhancements |
| Distribution services | SAP + RTSP + enhancements |
| Audio/Video on Demand (Push/Pull) services | RTSP + enhancements |

This information can be not only directly queried on purpose by the peers, but the directory servers themselves can also pro-actively disseminate it.

Capabilities

Various types of capabilities need to be negotiated among peers:
Media Types and QoS Contract Dimensions
Bitrates
Codecs
Terminal capabilities
Network Resource Reservation support The following paragraphs analyze in detail each type of capabilities.

Media Types and QoS Contract Dimensions

The type of media (audio/video/data) can be used for screening any piece of information in the E2ENP messages. Peers agree on a common set of media types. As an example, if a receiver requests to establish a live audio stream but the corresponding audio stream sender does not have a microphone, further negotiation of audio codecs is pointless and therefore it can be skipped. The use of media types thus translates in structuring the E2ENP messages in a format which is convenient for the peers while negotiating. In addition to media types, this invention identifies the need to include the list of QoS Contract Dimensions which the contracts are made of. As an example, one peer might want to negotiate frame-rate and frame-size, whereas other peers may want to negotiate frame-rate only.

As an example, it might be useless to try to negotiate frame-size, if a VoD server has only one representation (version) of the movie available, and there is no network media adaptation unit available.

This invention proposes the following format describing media type information:

mediaType = (audio(param_audio), video(param_video))

The refinements "param_audio" and "param_video" detail the QoS contract dimensions, like frame-size, frame-rate for video and sampling frequency and number of channels for audio, and are described in the next sections. This format is to be applied to each media type description in a given E2ENP message.

Codecs

Before peers can negotiate QoS Contracts or even Adaptation Paths (see below), they shall agree first on which codecs are generally applicable. The QoS achievable depends also on the type of codecs available. Furthermore, even though a given peer might be equipped with a given set of codecs, the use of such codecs is actually constrained by the availability of equivalent codecs by all the other peers.

Today's SIP implementations allow the negotiation of codecs at invitation time on a peer-to-peer basis, and with respect to the specification of well-defined streams. In the framework of the present invention an extension of such a SIP capability is proposed, by negotiating during step (1) of the above cited steps (1) to (4) the complete list of available codecs, irrespective of which streams will be used later at stream establishment time. In other words, peers can in this way agree on a common subset of codecs before the actual media specification takes place.

Furthermore, since current and future terminal devices shall be able to install or remove codecs "on the fly", the common set of codecs might need to be later re-negotiated during connection time (e.g. during a videoconference). The re-negotiation could be achieved by using new SIP messages.

Bitrates

Two main mechanisms are employed by clients to minimize the amount of bandwidth used for multimedia applications:

Using low (constant) bitrate codec thus reducing network resource consumption,

Using variable bitrate codecs

Clients have to agree on a certain set of compatible codecs. It must, however, be assured that the bitrate the codec generates is supported both by the clients (for sending/receiving) and by the network (both the access networks and the core). In addition, one codec may generate different bitrate levels, which depend on the codec configuration. As an example, the G.726 codec may generate bitrates of 16, 24, 23 or 40 kb/s. There may be situations where the receiver is able to handle only a certain configuration of the given codec. As an example, if the receiver uses a 19.6 kb/s modem, the receiver can only handle the 16 kb/s configuration of the G.726 codec. In addition, certain audio codecs and several video codecs can generate a variable bitrate, which is typically specified using a leaky bucket model. In this case the bitrate requirements are specified using a sustainable bitrate, a peak bitrate and a burst time (time duration that indicates how long the source is allowed to send at the peak rate).

This invention proposes that in addition to a negotiation of the set of compatible codecs, for each codec the peers have to agree on a valid codec configuration in terms of bandwidth that each peer can handle. The initiator provides and negotiates a set of bandwidth specifications with the peers using the leaky bucket model (sustainable bitrate, peak bitrate, burst time), which supports both constant and variable bitrates. In the above example, both parties would agree on the G.726 codec with the following bitrate specification: (sustainable bitrate, peak bitrate, burst time)=(16, 16, N/A).

Having agreed on a compatible codec configuration in terms of bitrates, actual target bitrates that are being used in the actual configuration are negotiated with the network during step (3).

Terminal Capabilities

The physical characteristics (e.g. monitor size) of terminal devices may change from is model to model, and affect the delivery of services over telecommunication networks. This is important, as it makes no sense for instance to stream a video in HDTV quality to a mobile phone, which is equipped with a much smaller display. Therefore, peers have to agree on terminal capabilities when negotiating QoS. Such terminal capabilities are e.g. the size of the display, the number of colors available, the general capabilities of rendering a given media type (e.g. if an audio mixer is available), and all kind of information for services that are necessary for rendering a given media type.

To this extent, the Composite Capabilities/Preference Profiles [CC/PP] framework language (a combination of XML and RDF) and request/response HTTP protocol offer a handy way for specifying terminal capabilities in an RDF format.

Network Resource Reservation Support

It is useless to try to demand network resources end-to-end using a signaling protocol like RSVP, if it can be determined a priori that one or multiple remote peers are not RSVP aware. To this extent, a possible solution is to ask peers to check if a given signaling protocol is available at their access networks.

A less complex solution is that, during pre-negotiation, peers indicate to each other along which direction they are going to reserve network resources. Allowable values are N/A, sender, receiver, sender/receiver, where the concepts of sender and receiver relate to the resource reservation protocol used (if any). This information can in fact model the type of reservation protocol used, if any.

For instance, in a simple Video-on-Demand service scenario with RSVP available end-to-end, the client acts as a receiver, whereas the server acts as a sender, since RSVP is receiver-initiated. In case of YESSIR (see [Pan99]), which is sender-initiated, the configuration—from a resource reservation protocol perspective—would be the opposite.

Similarly, in a videoconference scenario with end-to-end RSVP support, each peer would be typically configured as a sender/receiver.

If no direction is specified for a given peer, the corresponding peers can immediately deduce that no network resource reservation mechanism is available on the given peer. The key point is that this model allows to cope also with cases where no QoS signaling protocol (like RSVP) is available end-to-end. In such a case, each peer would be simply modeled as a sender (or nothing at all). This invention integrates the latter solution.

QoS Contract

QoS Contracts are hereby defined as sets of high-level QoS characteristics, each expressed in terms of any of the following:

Operating target: the desired value

Operating region: a desired interval of values

Thresholds/limits: a set of values marking different states with respect to the QoS adaptation business logic.

Any of the aforementioned QoS specifications can eventually be furthermore expressed in a statistical format, by e.g. stating percentiles, mean value, variance, etc.

Adaptation Path

Peers can agree not only on a given QoS Contract, but also on alternative ones, which can be advantageously used whenever the network and/or terminal resources availability change over time. In such a way, each peer will exactly know which alternative QoS Contract (and under which circumstances) shall be enforced in order to cope with a critical QoS Change or with any QoS Violation with respect to the currently enforced QoS Contract.

During the step (1) of the above-identified steps (1) to (4) only stream-related Adaptation Paths are pre-negotiated. Higher level ones (associated with QoS Correlation issues) shall be negotiated at higher level at step (2) of the above-identified steps (1) to (4).

Together with the best-case QoS Contract, the Adaptation Path forms an extended QoS Contract. This extended QoS Contract is negotiated and indexed. If a peer later decides to switch to a lower level of QoS, only the index identifying the QoS Contract as a state of a hierarchical Finite State Machine is needed to tell the other peer to adapt to that QoS State.

Types of E2ENP

The actors participating to communication sessions can act roles like:

Sender/Receiver: the Sender can be solely transmitting data to a Receiver, whereas a Receiver receives data from a Sender. A two-way conference can be modeled with a Sender/Receiver and Receiver/Sender pair.

Initiator/Responder: the initiator invites responders to participate to a communication session. The responder waits for a request from the initiator.

Possible combinations are:

Initiator and Sender→Responder and Receiver

Initiator and Receiver→Responder and Sender

In the case where the Initiator is the Sender, the Sender of a media stream initiates the session (the Sender invites and the Receiver waits to be contacted). In the case where the Initiator is the Receiver, the Receiver of a media stream initiates the session (the Receiver invites and the Sender waits to be contacted). An Initiator/Sender can talk with a Responder/Receiver. An Initiator/Receiver can talk with a Responder/Sender.

In the following the key scenarios affecting the type of E2ENP considered in this invention are listed.

Peer-to-Peer negotiation: Can be actually extended also to multiple peers participating to e.g. a videoconference, but where each peering is regulated by a direct peer-to-peer QoS negotiation mechanism.

1×N Multicast negotiation: In this case, a sender and multiple receivers need to negotiate one or multiple QoS characteristics at a time. This can be done either on a connection-wide basis (i.e. determining a least common denominator good for all peers) or on a receiver-selected basis (peer-to-peer negotiation for some QoS characteristics among certain peers—see previous point). In case of a best effort level of agreement, receivers are still able to communicate even if they cannot agree on a least common QoS level, otherwise (e.g. in case of a guaranteed QoS policy), those receivers must be dropped or other mechanisms have to be used. As an example, media filters or transcoders can be used in between a Sender and a Receiver to tailor media streams in such a way, that Receivers' capabilities and QoS states can be matched with Senders' QoS states. The media transcoder can be used to translate from one representation to another (e.g. switching the codec of the media stream from PCM to GSM audio). Media filters can be used for finer granular adaptation of media qualities (e.g. adapting to frame size, frame rate or desired quality without forcing the sender to adapt).

The connection-wide E2ENP can be effectively used for enforcing QoS Correlation among multiple flows from various sources. The 1×N Multicast negotiation may be used for determining the common QoS not only for the case of a unique Sender transmitting to multiple Receivers, but also for the case of an unique Receiver correlating the QoS of incoming flows from many Senders.

ITU-T Recommendation X.641 (December /1997) ISO/IEC 13236:1998, Information technology—Quality of Service: Framework, describing the aforementioned types of negotiations, deals with 3-party negotiation, involving an Initiator, a Provider, and one or multiple Responders. In this invention we limit our scope however to the relationship between an Initiator and one or multiple Responders at application level. The choice of not directly involving explicitly Providers is due to the fact that Providers are only concerned with traffic and admission control. Therefore, only traffic contracts need to be negotiated between peers and the Network Providers. this can only be done during session establishment, as it does not make sense to reserve resources (especially network ones) for a given period of time in advance, i.e. without using them.

Peers can therefore perform the hereby-described E2ENP pre-negotiation phase by agreeing upon nominal QoS levels. During actual connection establishment, peers then use the pre-negotiated contracts. These are tested locally, and resources are reserved. The result of this stage is then offered to the peers, and any excess resources are eventually released. Finally, at this level, network resources are reserved, which again may lead to release of excess resources. By monitoring the actual connection quality, peers can then decide at any time whether the given pre-negotiated QoS contracts are satisfied. And if not, whether and how to select an alternate QoS level, based on the pre-negotiated adaptation path. Provisions to avoid frequent requests to change network resource reservations are put in place by properly introducing tolerances and hysteresis in the QoS contracts and adaptation paths, as described in the European Patent Application 00 126 975.2 [Manda00b].

In any case, during the pre-negotiation phase, each peer assesses the bids received from other peers against pre-configured User-Profiles, which contain pre-computed Adaptation Paths. The assessment can be achieved by comparing each parameter of is each QoS Contract provided in the bid, with the corresponding information contained in the User Profiles. The decision whether to accept a bid or formulate a counteroffer is made with respect to all the QoS Dimensions of the bid QoS Contracts. Should the bid propose QoS Contracts with different QoS Dimensions, only the subset of mutually understood QoS Dimensions would be taken into account.

The initiator associates each QoS Contract of its bid with an identifier. Responders will notify the acceptance of a given QoS Contract (or the proposal for an update thereof, as a counteroffer), by specifying the corresponding identifier. Should a Responder feature a better QoS Contract resolution (like in the case of a given bid QoS Contract, in correspondence to which multiple QoS Contracts with "finer" granularity, are available at one of the Responders), said Responder may return a counteroffer with new QoS Contracts. It is up to the Initiator to collect these counteroffers, choose the most meaningful ones, associate them with new identifiers, and propose them to all peers in a new negotiation round.

Mapping between Type of Service and Type of E2ENP

The following paragraphs describe how E2ENP can be deployed with respect to the various types of services mentioned above.

Conversational Services

This is the case of services like real-time videoconference or CSCW. The key characteristic of these services is that the type of content exchanged among peers is most likely based on user interactions with the systems and with other peers. For instance, most of video flows will carry live images (e.g. taken from a webcam).

Another important aspect is that peers need to agree beforehand on a given agenda, which includes the start-time and duration of the service. This is typically accomplished by using SAP and SIP, in the Internet world. The manner how this type of services is actually deployed, is highly implementation dependent. Taking a videoconference as an example, special bridges are used in the telecom world so as to offer a star topology solution. Any interested party can thus join a videoconference by simply contacting the bridge. In the Internet world on the other hand, it is common the use of multicast technology: any interested party would simply have to "tune" on the proper multicast group. From an E2ENP perspective, however, we hereby assume that peers shall use unicast signaling for negotiating a common level of QoS.

Conversational services can be modeled as cases of one Initiator and multiple Responders, where all peers can act as Sender and/or Receiver. Furthermore, from a resource reservation protocol, each party can use either a sender-driven or a receiver-driven network resource reservation protocol (if any). Thus, an Initiator requests some resources from the network and from a Responder (since the Responder has to provide the resources for decoding and displaying). In addition, the Initiator manages its own resources locally.

Distribution Services

Distribution services can involve a content provider and (i) known or (ii) unknown content consumers.

In the former case, SIP or RTSP extension might be used similarly to the case of information retrieval services (see below), in the latter case SAP extensions are hereby taken into account. The sender shall simply announce the list of multicast groups, which the receivers may choose from for "tuning" on the current content distribution.

Except for the case of known content consumers, only a reduced version of E2ENP can be mapped to SAP. The Adaptation Path can be simply modeled as having the content provider streaming the same content with different QoS levels to different multicast groups (one per QoS level). Content consumers shall therefore simply monitor the level of QoS available at their terminal/access network, and eventually tune on another multicast group if any QoS Change or QoS Violation occurs in the meanwhile. Alternatively, the fullblown E2ENP could be used in conjunction with media filter/transcoder in the network, tailoring the media streams to match the different QoS levels. To this extent, the content consumers should simply instruct the media transcoders/filters to switch to a new QoS level. It is up to the Content Provider and to the Receivers to ensure that the streams distributed on different multicast groups are mutually synchronized.

For optimization purposes, the sender may however collect statistics concerning the number of receivers per multicast group (channel), so as to avoid flooding the network with packets of unused channels. This requires signaling between the Content Provider and each Receiver. This invention however does not address such cases.

Information Retrieval Services

This type of services is typically managed by using RTSP protocol. This invention proposes enhancements of such protocol for achieving E2ENP goals similarly to what described for the case of conversational services. More specifically, one has to note that the RTSP process is initiated by the receivers by requesting the sender to describe a given media (e.g. a video stream) through the RTSP DESCRIBE method. Through this method, a receiver gets informed about the various levels of QoS, which the sender may enforce for playing out the given media. The receiver has thus the possibility to choose which level to enforce at any given time. This is a form of pre-negotiation process paired with a fast negotiation cycle, similar to the concept presented by this invention. The key idea is to enhance the TRSP DESCRIBE method to include all the information about capabilities described above, and to integrate RTSP with the hereby-presented distributed resource management mechanism.

QoS Correlation features can also be achieved by using SMIL [SMIL98]. This invention does not address the integration of such technology.

End-to-End Re-Negotiation Protocol (E2ERP)

The E2ERP is the subset of the E2ENP focusing on re-negotiation issues. This protocol is activated whenever:

1. QoS Violations have been detected at functional entity involved in the transmission process; or
2. the current monitored level of QoS is no longer compatible with the currently enforced QoS Contract; or
3. a notification of newly discovered additional resources has been received by some specific functionality; or
4. one of the peers decided to enforce a different QoS Contract (e.g. the user requested a higher frame-rate).

Cases 2 and 3 are mostly related to optimization processes, which allow applications to upgrade/degrade their QoS requirements in a smooth manner, whereas case 1 deals with dramatic shortages of resources, which badly affect applications, if not properly and promptly treated.

To this extent, case 1 implies re-negotiating local and eventually network resources without the need to try to maintain the previously reserved resources, whereas this is not possible in cases 2 and 3. This means that whenever dealing with optimization issues, one has to take care of:

either allocating resources in excess of the difference between the previously allocated resources and the new amount (in the case of QoS upgrade);

or allocating the new resources from the scratch, while keeping the old ones until the re-negotiation has been successfully completed (pessimistic approach). This can also be modeled as trying to allocate more resources while still keeping the old one. If this re-allocation fails, the originally reserved resources are still reserved, otherwise the newly allocated resources are available;

releasing some resources to switch to a lower QoS state (in the case of QoS downgrade).

The first option seems to be quite attractive, but some resources might not be easily shared among different QoS States. For example, the scheduling information about the thread of a given codec might be totally useless, if the codec is going to be preempted and substituted with another one, which runs on a totally different thread.

Therefore the second approach, though pessimistic, seems to be the most realistic one. In the following we will therefore refer explicitly to the allocation of new resources and later release of old ones. In addition, releasing resources is always possible, because the system load is decreased.

Whenever a re-negotiation is triggered, each peer determines from the pre-negotiated Adaptation Path the best alternative QoS Contract that should be enforced in order to cope with the detected QoS Change/Violation. The identity of the new QoS Contract is exchanged among peers, in order to come to an agreement on which QoS Contract should be actually enforced. Having previously negotiated the Adaptation Path allows the peers to more efficiently perform such re-negotiating, by simply exchanging identifiers. Should all peers detect a violation simultaneously, some form of contention resolution algorithm would need to be enforced. To this extent different well-known techniques are available: assigning master/slave roles (typically assigning to the Initiator the master role), or re-attempting after a random time has elapsed. This invention leverages the master/slave mechanism.

In summary, the following types of re-negotiation are identified:
a) re-negotiation-triggered by a QoS violation detection, where new resources are allocated from the scratch and the old resources are automatically released (for QoS downgrade cases, this might be not an issue);
b) re-negotiation for optimizing the system, where new resources are allocated from scratch and the old resources are released later, at E2ERP successful completion; and
c) re-negotiation for optimizing the system, where new resources are allocated from scratch and the old resources are automatically released.

A framework for Dynamic End-to-end QoS Negotiation and Control

This invention presents a framework for achieving dynamic end-to-end QoS negotiation and control coordination, for distributed multimedia applications. The framework builds upon dynamic capability negotiation and specification of Adaptation Paths and QoS Contracts, based on user preferences. These principles will now be explained with reference to the figures.

The Initiator 101 finds the protocol version using a Protocol Discovery Unit 104, 213 via interface 214, which queries a Directory Server 102, 215. This is coordinated with the local Coordination Unit 204. The Session Protocol Unit 205 is used for all kind of negotiations and communication. In particular it negotiates with the Peer 216 (which is the Responder 103) a common set of capabilities and configurations and thus builds a vocabulary in the Pre-Negotiation phase 106. It also negotiates QoS Contracts and Adaptation Paths that are used for the Multi-Stream QoS synchronization and QoS correlation phase 107. Local Resource management is carried out by the Local Resource Management Units (responsible for CPU, buffer and other local resources) 206 via interface 211. Local Resource management is coordinated by the Coordination Unit 204 with network resource reservation, which is carried out by the Network Resource Reservation Unit 207, via interface 212.

Any end-to-end interaction during communication session establishment, i.e. during the Fast Negotiation phase 108, is carried out by following the Economy Principle. This principle states that first local, then peer and finally network resources are reserved. If during the communication session a re-negotiation is necessary due to a change in resource availability or to any other reasons influencing resource availability, the Re-Negotiation phase 109 is carried out by following the Economy Principle as well.

Finally, resource reservations release is done during the Release phase 110. The local Protocol Stack 208 interfaces with the Session Protocol Unit 205 via the interface 217 and implements the session protocol. In addition, the Protocol Stack 208 implements the network resource reservation protocol which is controlled via interface 210.

The QoS-Aware Application Unit 202 uses a FSM Engine Unit 203 to control the states of all the streams that the QoS-Aware Application Unit 202 handles. The Coordination Unit 204 together with FSM Engine Unit via interface 209 provides the QoS-Aware Application Units 202 with the possibility to establish, use, control and release network connections with other applications, using QoS guarantees. Establishing such connections involves negotiation of capabilities, configurations, QoS Contracts and Adaptation Paths (managed by the FSM Engine Unit 203), and integration of local, peer, and network resources according to the Economy Principle. Control involves re-negotiation and integration of local, peer, and network resources and may involve a state transition managed by the FSM Engine Unit 203, in cooperation with the Coordination Unit 204. Release involves network and local, as well as peer resource tear-down and state management (by the FSM Engine Unit 203), in cooperation with the Coordination Unit 204.

This invention also presents the concept of the E2ENP Broker 105, an optional third-party entity, which can be used for relieving peers 101, 103 from performing the time- and resource-consuming Pre-Negotiation phase 106 (and eventually also the Multi-Stream QoS Synchronization and QoS Correlation 107). Each peer 101, 103, after discovering from a Directory Server 102 which E2ENP Broker 105 to contact, can upload its Adaptation Path, Capabilities, and the list of peers to contact on said E2ENP Broker 105. The E2ENP Broker 105 may be implemented e.g. as an enhanced version of audio-/videoconference bridges, or by combining an enhanced SIP proxy server (or SIP redirect server)—dealing with the negotiation process—and an enhanced version of a SIP registrar—storing the Adaptation Path and Capabilities and all the intermediate negotiated versions thereof.

The E2ENP Broker 105 thus collects such information from each peer 101, 103, and performs the negotiation process locally in its memory space. During this process, the E2ENP Broker 105 may eventually contact some of the indicated responders 103 on behalf of the initiator(s) 101, should such responders 103 do not have yet stored their information on said E2ENP Broker 105. Once the negotiation has been carried out successfully, the E2ENP Broker 105 will notify the peers 101, 103 about the availability of the results, and each peer 101, 103 can then download said results. The E2ENP Broker 105 can also allow multiple negotiation iterations (otherwise too expensive to be carried out among peers themselves). Responders 103 might disagree with a bid from the Initiator 101, and therefore provide counteroffers. The analysis of counteroffers involves multiple round-trip message exchanges among peers, and therefore is too time consuming. The E2ENP Broker 105 can mediate all this process.

EXAMPLE

The example in this section is illustrating the concepts of our invention. It is based on a real-time multimedia conferencing scenario using IP-based networks. Media transport is carried out by using RTP/RTCP.

For simplicity reasons, we are showing the invention's principle using a pseudo-protocol (QUERY, RESPONSE, COMMIT, START, START_ACK, RESERVE, CONFIRM) which can be mapped onto existing SIP/SDP plus extensions to be standardized. Also, this example is restricted to two peers A and B. Let us assume that the Initiator 101 wants to receive a media stream (let us assume video) from the Responder 103.

The E2ENP process starts with the Pre-Negotiation phase 106 assuming that the Protocol Discovery 104 has successfully been completed earlier, figuring out a common E2ENP version that both parties understand.

In the Pre-Negotiation phase 106, the QoS-Aware Application Unit 202 requests-a negotiation using the local FSM Engine Unit 203, providing a bid. This bid contains a list of capabilities and configurations as well as QoS Contracts and the Adaptation Path(s), which are all indexed. The description of the bid can be realized using SDP extensions (e.g. as a new feature of the currently investigated SDPng [DPNG00]).

The Coordination Unit 204 forwards the bid via the session protocol unit 205 to the peer using the QUERY message, which can be based on SIP extensions. The peer's Session Protocol Unit 205 receives the QUERY and asks the Peer Coordinator 204 to evaluate the bid using the Peer FSM 203. The Peer FSM matches the bid with its own adaptation path and capabilities and generates a common subset, which is forwarded in the Response massage via the Peer Coordinator 204 to the Peer Session Protocol Unit 205, which generates a RESPONSE message which can be based on SIP extensions. The initiator's Session Protocol Unit 205 upon reception of the new bid forwards an evaluate request to the local FSM 203 via the Coordinator 204. Finally, the new bid is again checked for compatibility (it might be empty indicating that the peers are incompatible) and the Initiator's (101) FSM Engine 203 collects all the new bids from all responders and generates a common subset, which is sent to all peers. This is done by first sending an enforce message to 204, which forwards it to 205. The initiator's Session Protocol Unit 205 generates the commit message, which can be based on SIP extensions. This message carries the bid-match result (which can be described using SDP extensions). This is distributed to the session protocol unit 205 of the responder 103, which enforces the result via the Coordination Unit 204 to the FSM 203. At this point, all communication partners have agreed on a common set of codecs, capabilities, adaptation paths and QoS states and are able to decode later on the references (denoted as StateIDs).

The assumption which shall be made now is that the initiator 101 wants to initiate the actual session, which contains one video stream. The states and adaptation paths have been negotiated during the pre-negotiation phase 106 just described. The QoS-Aware Application Unit 202 of the Initiator 101 requests a start of the stream given a StreamID and its desired StateID from the local Coordinator Unit 204, which first performs local admission tests and reserves the resources locally requesting the resources from the Local Resource Management Units 206. If the desired state cannot be fulfilled due to local resource problems, the Coordinator Unit 204 would request the FSM Engine 203 to try the next QoS State having lower resource requirements according to the negotiated Adaptation Path. After local successful resource reservation, the start request is propagated to the local Session Protocol Unit 205, which sends a START message to the peer's Session Protocol Unit 205 message, which can be based on SIP extensions. This message contains the enforced StateID and Stream ID (which both can be modeled by using SDP extensions). The start message is forwarded via the peers Coordinator Unit 204 to the peers FSM Engine Unit 203, which checks for a valid StateID. If this is approved, the FSM Engine requests resources for handling the media streams using the Coordination Unit 204 and the services provided by the Local Resource Management Units 206, which perform admission tests and reserve the resources at the peer.

Note that if the resources at the peer cannot be granted, the peer Coordination Unit 204 requests the FSM Engine Unit 203 to select a new StateID according to the pre-negotiated Adaptation Path. If everything is approved, the peer Coordination Unit 204 requests the peer Session Protocol Unit 205 to send an START_ACK to the Initiator's 101 Session Protocol Unit 205 with the new StateID, which is forwarded via the local Coordination Unit 204 to the local FSM Engine Unit 203. The local FSM Engine Unit 203 checks for compatibility of the states and, if approved tells the local Coordination Unit 204 to request reservation of network resources (e.g. using RSVP) via the local Network Resource Reservation Unit 207. If the StateID were different from the originally selected one, it would instruct the Local Resource Management Units 206 to update the local resource reservation according to the new StateID (which is not shown in FIG. 2, because we assumed that everything was fine). Additionally, the Coordination Unit 204 may request the Session Protocol Unit 205 to send a RESERVE message to the peer 103, should that peer be responsible to manage network resource reservation within the access networks they are attached to [Marsh00]. In such a case, upon reception of the RESERVE message through its Session Protocol Unit 205, the peer 103 would trigger its Coordination Unit 204 to request network resources via the peer's Network Resource Reservation Unit 207 (e.g. using RSVP). Once resources have been reserved at the network level, the Coordination Unit 204 at the peer 216 sends a confirmation back to the sender using the CONFIRM message, which is received by the local Session Protocol Unit 205. This unit generates a confirmation to the local Coordination Unit 204. Once the Initiator 101 has collected all the confirmations from all the Responders 103, it releases the role of the Initiator 101 and everything is setup properly.

For performing concurrency control, anybody starting a Pre-Negotiation phase 106, Multi-Stream QoS Synchronization and QoS Correlation phase 107, Fast negotiation phase 108, or Re-Negotiation phase 109 can take the role of Initiator 101. Therefore it will start sending messages to known peers inviting them to participate in the given phase. If none of the other peers is acting as Initiator 101, Peer 216 realizes it is acting as an Initiator 101 and waits confirmation of resource reservation (aggregate local and network) from Peers acting as Responders 103. Otherwise, if one of the Peers 216 is already acting as Initiator 101, said Initiator 101 will add the prospecting Peer 216 to its list of Responders 103, and the prospecting Peer 216 will wait to get invited by said Initiator 101.

Once the given phase is over, i.e. once the given Initiator 101 has collected all the confirmations from all the Responders 103, the given peer acting as Initiator 101 "releases" the role of initiator. In this mode a token passing mechanism is used, where the acquisition of the token grants the role of Initiator 101 and the passing is done once a phase is completed. In this way also the case of collisions is covered by using a master-slave approach, where the master is the Initiator 101 and the slave is the Responder 103. The Initiator 101 commands the Responder 103 when to start network reservation. In any case, network reservation would be carried out concurrently among peers (except for the case of a QoS reservation signaling protocol—like RSVP—where available end-to-end).

ASPECTS OF THE PRESENT INVENTION

Now the different concepts proposed by the present invention will be explained:

Integration and extensions of different existing protocols and technologies for defining the E2ENP (including E2ERP): More specifically, this aspect encompasses the following phases: Protocol Discovery 104, Pre-Negotiation 106, Multi-Stream QoS Synchronization and QoS Correlation 107, Fast-Negotiation (with Economy Principle) 108, Re-Negotiation (with Economy Principle) 109, Resource Reservation Release 110. All the six phases can be concatenated, or be executed at different times. The Multi-Stream QoS Synchronization and QoS Correlation 107 phase is optional, insofar as it is required only if Peers 216 interact by sending/receiving multiple streams, which need to be correlated and synchronized. The Protocol Discovery 104 and Pre-Negotiation 106 phases can be executed a priori, and the results can then be applied to multiple successive communication sessions, whereby each communication session is initiated with a specific Multi-Stream QoS Synchronization and QoS Correlation phase 107. Should even the results of the latter phase be applicable to multiple successive communication sessions, each of said communication sessions can be initiated with a specific Fast Negotiation phase 108. The protocol interacts with the Local resource management units 206 during Pre-Negotiation 106, Multi-Stream QoS Synchronization and QoS Correlation 107, Fast Negotiation 108, Re-Negotiation 109 and Resource Release 110 phases.

Economy Principle: According to this aspect, the resource admission control and resource reservation can be applied following this order: On the E2ENP Initiator 101 first, then on the E2ENP Responder(s) 103, and finally on the network using 207. In the first two steps, issues like real-time CPU scheduling, memory management, and power management are addressed. The same process applies in case of re-negotiations, with the difference that previous allocated local resources need to be updated (either released or re-allocated) either immediately or later during the Resource Reservation Release 110 phase. For the Resource Reservation Release 110 phase, first network resources, then peer, and finally local resources are Concept of E2ERP: According tot his aspect, during runtime of a so established multimedia session, at any time any component may request an adaptation. This again requires coordination of local, peer and network resource management, according to the Economy Principle. When performing this adaptation, user-defined or user-provided preferences can be used implicitly in order to build the Adaptation Path.

Pre-negotiation of type of E2ENP: This can be done during Protocol Discovery phase 104, either by forcing peers 101, 103 to query a Directory Server 102, or by having the latter announcing such information. Instead of a directory server, a SIP registry server can also be used.

A Pre-negotiation of capabilites: This can be done during Pre-Negotiation phase 106, by using specific protocol, e.g. SIP/SDP plus extensions.

A Pre-negotiation of complete codec list: This can be done during Pre-Negotiation phase 106, by using specific protocol, e.g. SIP/SDP plus extensions.

Pre-negotiation of Adaptation Paths at stream level: This can be done during Pre-Negotiation phase 106, by using specific protocol, e.g. SIP/SDP plus extensions.

Pre-negotiation of Adaptation Paths at stream aggregation level: This can be done during Multi-Stream QoS Synchronization and QoS Correlation phase 107, e.g. SIP/SDP plus extensions.

Indexing of pre-negotiated QoS Contracts and Capabilities for speeding up the Fast Negotiation phase 108.

Indexing of pre-negotiated QoS Contracts and Capabilities for speeding up the Re-Negotiation phase 109.

Modeling the data model, described in EPA 00 126 975.2, in an extended version of either SDP or SDPnG. Handling installation/de-installation of Capabilities even at runtime, by exchanging asynchronous messages among peers for notifying such events. This can be based on e.g. SIP/SDP plus extensions.

Support of a E2ENP Broker 105: this is an optional third-party entity, which can be used for relieving peers 101, 103 from performing time- and resource-consuming Pre-Negotiation phase 106 (and eventually also the Multi-Stream QoS Synchronization and QoS Correlation 107). Each peer 101, 103, after discovering from a Directory Server 102 which E2ENP Broker 105 to contact, can upload its Adaptation Path, and the list of peers to contact on said E2ENP Broker 105. The E2ENP Broker 105 may be implemented e.g. as an enhanced version of audio-/videoconference bridges, or by combining an enhanced SIP proxy server (or SIP redirect server)—dealing with the negotiation process—and an enhanced version of a SIP registrar—storing the Adaptation Path and Capabilities and all the intermediate negotiated versions thereof. The E2ENP Broker 105 thus collects such information from each peers 101, 103, and performs the negotiation process locally in its memory space. During this process, the E2ENP Broker 105 may eventually contact some of the indicated responders 103 on behalf of the initiator(s) 101, should such responders 103 do not have stored their information on said E2ENP Broker 105. Once the negotiation has been carried out successfully, the E2ENP Broker 105 will notify the peers 101, 103 about the availability of the results, and each peer can then download the results.

Use of E2ENP Broker 105 to allow multiple negotiation iterations, which would otherwise be too expensive. Responders 103 may disagree with a bid from the Initiator 101, and therefore provide-counteroffers. The analysis of counteroffers involves multiple round-trip messaging among peers, and therefore is too time consuming. The E2ENP Broker 105 can mediate and speed up the given process.

Extension of SIP and RTSP for Pre-Negotiation 106 of Adaptation Path (at stream level) and Capabilities, by piggybacking this information in existing messages of SIP or RTSP.

Extension of SIP and RTSP for Pre-Negotiation of Adaptation Path at stream aggregation level 107, by piggybacking this information in existing SIP or RTSP messages (according to EPA 00 111 191.3).

Protocol procedures and messages for addressing Fast Negotiation 108 and Re-Negotiation 109 phases (by using the identifiers associated with the pre-negotiated QoS Contracts of the Adaptation Path).

Extension of SIP/SDP and RTSP, by defining messages for addressing:
  a. QoS Contract negotiation;
  b. coordination of network resource reservation (if any) among peers.

Extension of SIP and RTSP for Fast Negotiation 108, by using indexed QoS Contracts and Capabilities.

Extension of SIP and RTSP for Re-Negotiation 109, by using indexed QoS Contracts and Capabilities.

Coordination of network resource reservation mechanisms among peers, according to the Economy Principle, by introducing acknowledged synchronization procedures in SIP and RTSP during Fast Negotiation 108 and Re-Negotiation 109 phases.

Extension of SAP for allowing Directory Servers 105 announcing types of end-to-end QoS negotiation protocols used.

Extension of existing directory protocols or of SIP with respect to the use of SIP Registrars, in order to store and/or retrieve types of end-to-end QoS negotiation protocols used for enabling the Protocol Discovery Phase 104.

Extension of SAP for announcing Adaptation Paths with respect to Distribution Services, where AP are simply listing various multicast groups, each targeting a specific QoS Contract.

All the E2ENP-related changes to SIP can theoretically be mapped onto H.323 as well.

Management of resource reservation release 110

The negotiation and re-negotiation of capabilities—during, respectively, the Fast-negotiation (with Ecoomy principle) phase 108 and the re-negotiation (with Economy principle) phase 109—include the signaling that the peers 216 need to exchange with each other, in order to agree on the choice of audio and/or video codec and the configuration thereof (bitrate etc.)

EMBODIMENT FOR THE IMPLEMENTATION OF THE PRESENT INVENTION

Figure 2:
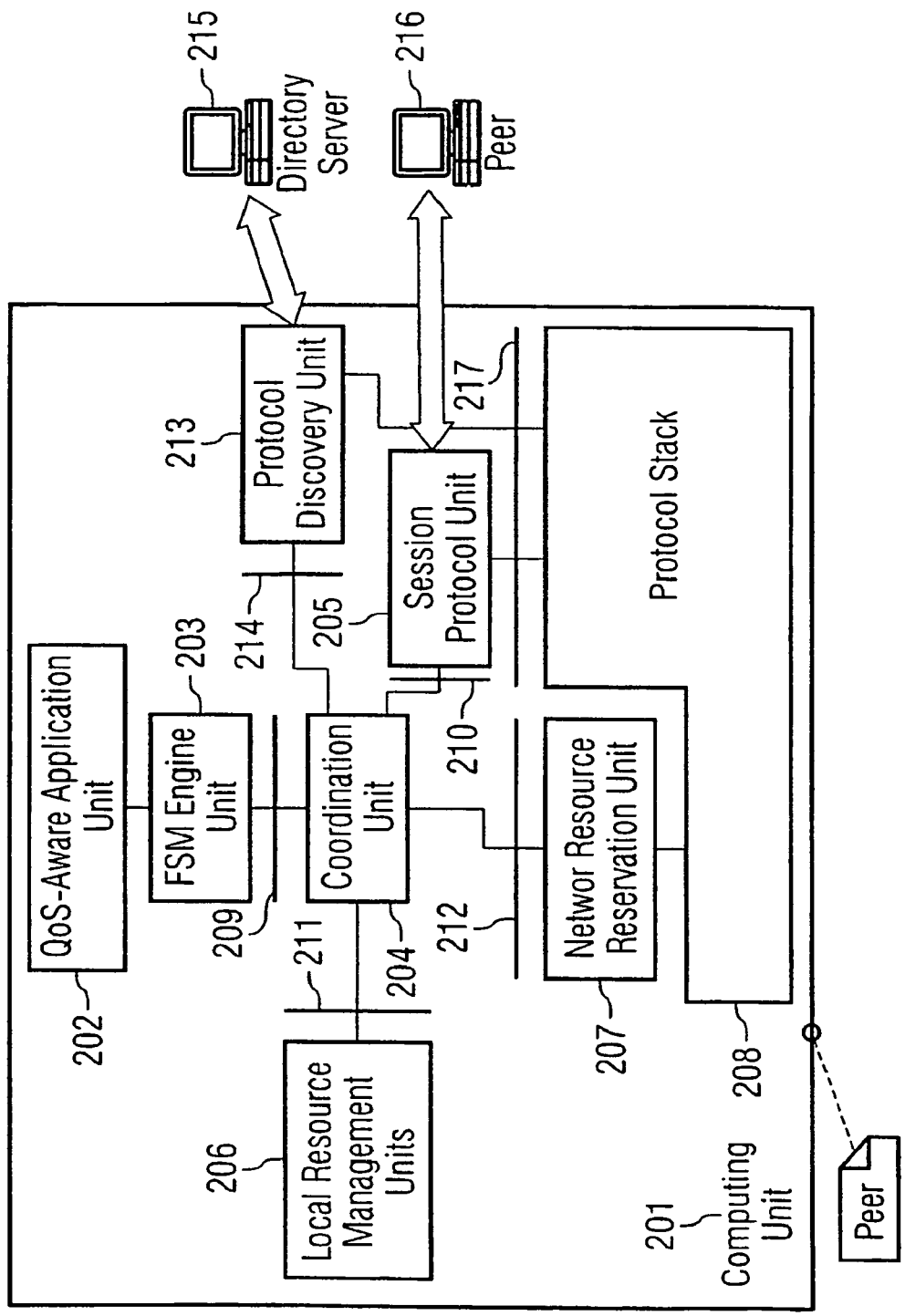
FIG. 2 shows a functional decomposition of a structure to implement the present invention.
Figure 4A:
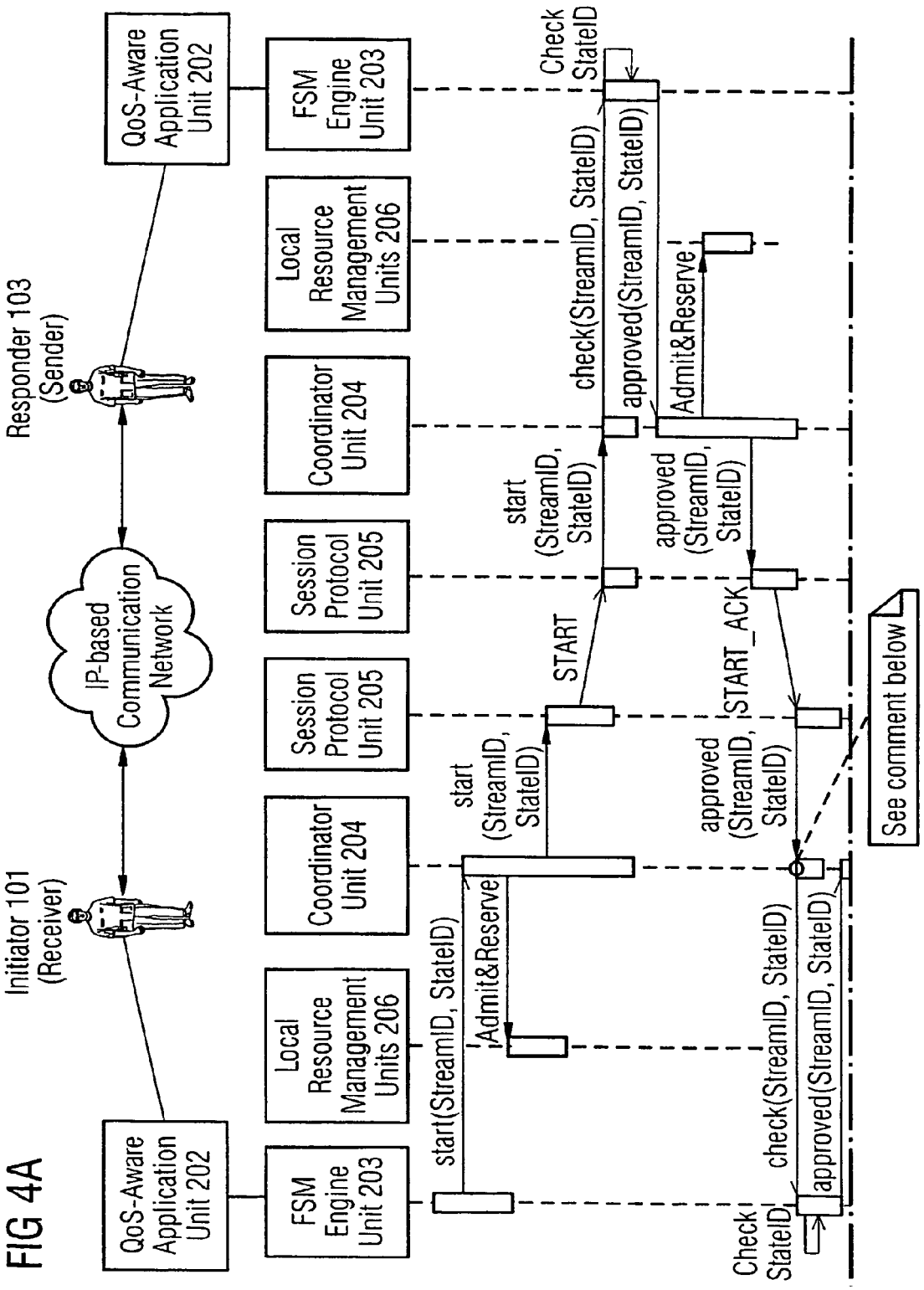
FIG. 4 shows an example of a fast negotiation phase 108 (MSC)

Now an embodiment for the implementation of the present invention will be explained with reference to FIG. 2:

Each Peer 216 consists of a Computing Unit 201 containing a Protocol Stack 208 (e.g. IP and TCP/UDP) and a Coordination Unit 204. The Coordination Unit 204 coordinates.

1. Protocol Discovery phase 104 through interface 214 to Protocol Discovery Unit 213;
2. Pre-Negotiation phase 106 and Multi-Stream QoS Synchronization and Correlation 107 through interface 209 to FSM Engine Unit 203, and through interface 210 to Session Protocol Unit 205;
3. Fast Negotiation phase 108 through interface 211 to Local Resource Management Units 206, through interface 210 to Session Protocol Unit 205, and through interface 212 to Network Resource Reservation Unit 207;
4. Re-Negotiation phase 109 through interface 209 to FSM Engine Unit 203 (for evaluating alternative QoS Contracts by using the Adaptation Path), through interface 211 to Local Resource Management Units 206, through interface 210 to Session Protocol Unit 205, and through interface 212 to Network Resource Reservation Unit 207;
5. Release phase 110 through interface 211 to Local Resource Management Units 206, through interface 210 to Session Protocol Unit 205, and through interface 212 to Network Resource Reservation Unit 207.

A FSM Engine Unit 203 can be part of a given QoS-Aware Application Unit 202, or can be a separate entity (middleware), which multiple given QoS-Aware Application Units 202 can use. The FSM Engine Unit 203 is a software process that, after having been configured with a given Adaptation Path, is capable of implementing the FSM associated with the given Adaptation Path, on behalf of the QoS-Aware Application Unit 202, in cooperation with the Coordination Unit 204.

A Protocol Discovery Unit 213 allows the Coordination Unit 204 contacting a Directory Server 215 (which might also be implemented as an extension of a SIP Registrar), in order to accomplish the Protocol Discovery phase 104. The Protocol Discovery Unit 213 extends the use of existing specific protocols (e.g. LDAP, SAP, SIP), by advertising and querying information about E2ENP, on behalf of the Coordination Unit 204.

A Session Protocol Unit 205 allows the Coordination Unit 204 carrying out the phases 106-110 with Peers 216. The Session Protocol Unit 205 extends current protocols like SIP/SDP or RTSP (or even H.323/H.245), by using SDP or SDPnG enhancements for describing bids/counteroffers for Adaptation Path and Capabilities, and by introducing SIP or RTSP (or even H.323/H.245) specific messages for implementing the signaling required for the phases 106 to 110, especially for the Pre-Negotiation phase 106 and the Multi-Stream QoS Synchronization and Correlation phase 107 (including the resource coordination according to the Economy Principle).

Interfaces 211 to the Local Resource Management Units 206 are identified with respect to the following classes of resources:
 CPU resources
 Memory (primary and secondary) resources
 Battery power
 External auxiliary resources For each class of resources, a specific Local Resource Management Units 206 is made available, e.g. as an extension of the Operating System loaded onto the Computing Device 201.

The interfaces 211 allow the Coordination Unit 204 to carry out the following tasks:
 Monitor resource usage, according to various criteria (e.g. ordered per stream or per process)
 Register (and de-register) for notifications to be forwarded to the Coordination Unit 204 once and/or anytime a given condition is met
 Reserve (and release) a given amount of resources (by e.g. setting a CPU deadline or pinning a memory area to a given process)
 Update a given reservation (for the re-negotiate case)
 Associate (and de-associate) a given entity, e.g. a process, to a class of local resources usage (this is typically done for those resources that cannot be directly manipulate without OS supervision). The class is a kind of priority, which the OS can use for optimizing resource usage according to the user's policies.

Each Peer 216 can take the role of Initiator 101, provided that all other peers are not acting as Initiator 101 in the meanwhile. The role is maintained for the whole duration of any of the following phases:
 Pre-Negotiation 106,
 Multi-Stream QoS Synchronization and QoS Correlation 107,
 Fast-Negotiation (with Economy Principle) 108, and
 Re-Negotiation (with Economy Principle) 109.

During the Resource Release phase 110, some of the peers not involved in the session tear down process—and thus willing to continue the session with any remaining peer—may also take the role of the Initiator 101 in a concurrent phase 107, 108 or 109.

Should a Peer 216 (thereinafter the peer A) try to act as an Initiator 101 and invite other Peers 216 to act as Responders 103 for one of the aforementioned phases, while said phase is ongoing (i.e. while one of the other Peers 216 is already acting as an Initiator 101), the peer A would be notified that it needs to wait an invitation from the currently active Initiator 101, and the latter would have to add peer A to its list of Responders 103.

The conclusion of any of the aforementioned phases coincides with the collection at Initiator 101 side of all the confirmations of successfully reserved network resources from all the Responders 103. The Initiator 101 has to validate each confirmation against to all the others already received, in order to eventually rebalance the use of resources among peers, by taking corrective actions.

Once the conclusion has been reached, the Peer 216 acting as Initiator enters in a neutral state, thus releasing the role of Initiator 103 to any prospective Peer 216. The role of Initiator 103 can be thus modeled as a logical token (the Initiator Role Token IRT), which can be exchanged among peers once any of the aforementioned phases is over.

Other Peers 216 can join an already active communication session among multiple Peers 216. Is it really necessary and/or feasible in these cases to re-negotiate everything? One key point of this invention is the de-coupling of the Pre-Negotiation 106 phase from the actual Multi-Stream QoS Synchronization and QoS Correlation 107, Fast-Negotiation (with Economy Principle) 108, and Re-Negotiation (with Economy Principle) 109 phases. As long as Peers 216 agree beforehand, at session advertisement time, on what level of QoS to use, they can then join (or leave) an active session anytime, by using the fast indexed negotiation process described in this invention. The key problem, however, is how to deal with Peers 216 joining the conference at a later time, without having pre-negotiated anything. In this case, several options are available:
1. To re-negotiate everything from scratch among all Peers 216—this is an unfeasible solution, not only because of the service disruption with high latency, but also because this solution would enforce dependencies among the connections belonging to e.g. a videoconference session, which is unrealistic in most of the cases.
2. To force the new Peers 216 to accept the already pre-negotiated information: If a new Peer 216 does not accept this, he/she can not join the given session.
3. To enforce media adaptation through some filters embedded into the network, to meet the other preferences of the new Peer 216. More details on this concept can be found in [Pasqu92], [Pasqu93], [Yeado93], [Kassl99a]) and [Kassl99b].

As a conclusion, this invention assumes that either solution 2 or 3 is enforced by any application enabled to handle these issues (e.g. a conference control tool), and using the services of this invention this means that the solutions 2 and 3 are outside the scope of this invention.

Should the E2ENP Broker 105 be used and/or the negotiated vocabulary be stored in the Directory Server 102 or SIP registrar, the new participants can more advantageously get directly the pre-negotiated information from such entities, and thus trigger only the Fast-Negotiation (with Economy Principle) 108, Re-Negotiation (with Economy Principle) 109.

The temporary asymmetric Initiator 101/Responder 103 scheme is equivalent to a master/slave configuration, where the Initiator 101 acts as a master, and each Responder 103 as a slave.

During one of the Pre-Negotiation 106, Multi-Stream QoS Synchronization and QoS Correlation 107, Fast-Negotiation (with Economy Principle) 108, and Re-Negotiation (with Economy Principle) 109 phases it is therefore possible to resolve possible conflicts arising from Peers 216 independently initiating a phase.

During the normal conversation phase (i.e. after the Fast-Negotiation 108 phase), multiple Peers 216 can detect any QoS Change/QoS Violation simultaneously and this can lead to collisions in requesting to start correspondingly the Re-Negotiation 109 phase. To this extent, the last Peer 216 that took the role of Initiator 101 shall take again such a role and arbitrate the requests among peers. This means that each Peer 216 shall retain the identity of the Peer 216 that last acted as Initiator 101.

As a worst case, should however such a Peer 216 have left in the meanwhile the communication session, the collision would be inevitable. In such a case, each Peer 216 trying to "seize" the IRT, upon reception of similar request from other Peers 216 shall block for a random time, and retry when such a time has elapsed. If during this time, another Peer 216 has sent a request to seize the IRT, the Peer 216 suspended on said timer would be notified accordingly, and consequently it shall abort both the timer and its request to seize the IRT, and consequently take the role of Responder 103.

Figure 5:
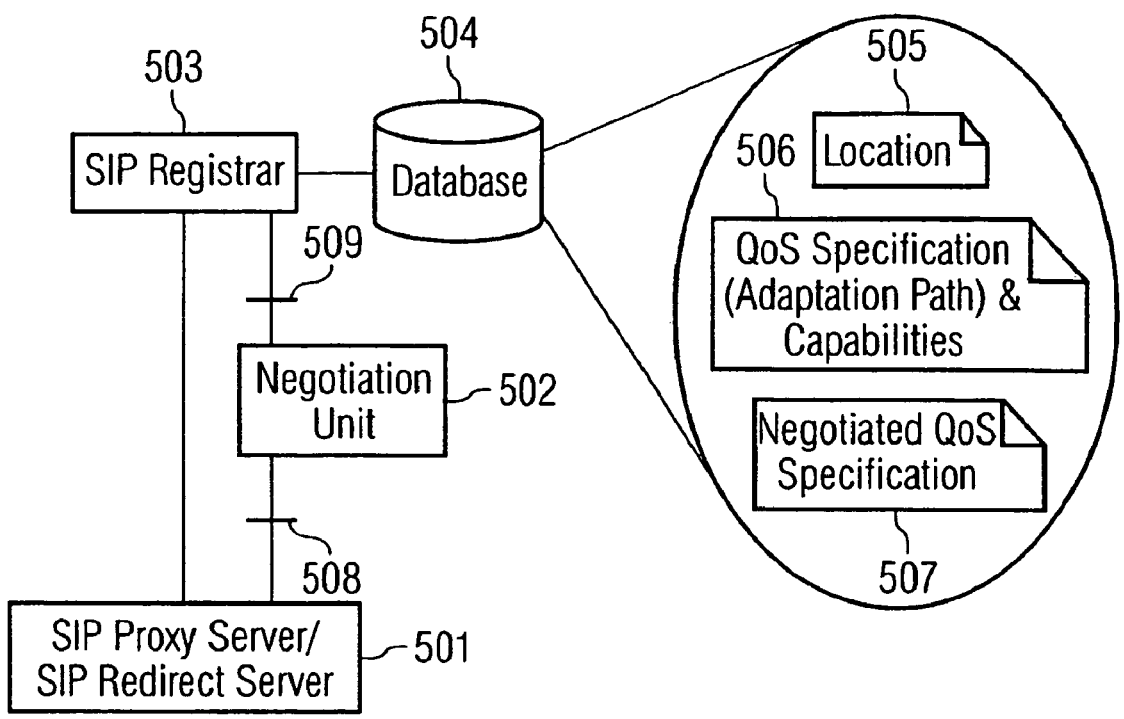
FIG. 5 shows an example for the implementation of an E2ENP Broker in case of SIP implementation.

In FIG. 5 an example for the implementation of the E2ENP Broker concept is shown, in which the Session Initiation Protocol (SIP) is applied as already mentioned in other parts of this application. SIP Proxy Servers and/or SIP Redirect Servers 501 are associated with SIP Registrars 503. This invention proposes to augment the location information 505 stored in the databases 504 used by the SIP Registrars 503 by including the QoS Specification and capabilities information 506 described in this invention. As well as the negotiated QoS information 507 (both the temporary results being drawn during negotiation/re-negotiation phases, and the ones finally agreed upon). Whenever registering with the SIP Registrar 503, users can thus upload the information 506 and 507. The E2ENP Broker 502 is a unit which communicates with the SIP Proxy Servers and/or SIP Redirect Servers 501 over a specific interface 508 by means of well known mechanisms (e.g. a JAIN SIP Servlet API): Whenever a E2ENP protocol implemented as a SIP extension is used, the E2ENP Broker 502 performs the negotiation and re-negotiation phases described in this invention in its memory space on behalf of all the peers by using the aforementioned information stored in the Registrar's database. The E2ENP Broker 502 communicates with the SIP Registrar 503 over the interface 509.

THE MAIN ADVANTAGEOUS DIFFERENCES BETWEEN THE INVENTION AND THE STATE OF THE ART

| Technologies | Comment |
| --- | --- |
| [Bor00] | The hereby-proposed mechanism for managing conference state during sessions and finding appropriate configurations, by negotiating for configurations and changing them, are based on this state of the art. This invention integrates this concept with local, peer and network resource reservation according to the economy principle. The invention introduces additional Adaptation Paths and QoS Contracts and references these using handles. Also, this invention includes terminal capabilities and network resource reservation support into the negotiation mechanisms. |
| [Burn00], [Kass100] and [Kass100a] | The hereby-proposed mechanism to integrate local and remote as well as network resource management in a framework is based on this state of the art. In addition, this invention defines the protocol that is necessary for negotiation of capabilities, preferences and QoS states and also identifies different versions of the protocol using a directory server approach or SIP registrar. |
| [Nahr95] | The hereby-proposed economy principle is based on this state of the art. This invention integrates this concept with existing Internet protocols, includes Adaptation Paths and Indexes and considers other resources like battery power or wireless sub-network availability. This invention extends the work by first pre-negotiating several candidate QoS Contracts and configurations thus building a common vocabulary. |

-continued

| Technologies | Comment |
|---|---|
| [RFC2533] together with [CONNEG00], [CONNEG00a] or [SDPCN01] | The hereby-proposed mechanism to represent media handling capabilities, express media feature sets and match feature sets (compare the bid with the local capabilities) is based on this state of the art. This invention integrates this concept with existing Internet protocols, includes Adaptation Paths and integrates local as well as network and peer resource reservation. This invention extends the work by first pre-negotiating several candidate QoS Contracts and configurations thus building a common vocabulary. |
| [RFC2703] | The hereby-proposed mechanism for protocol independent negotiation of QoS contracts and capabilities is based on this state of the art. This invention however negotiates QoS contracts, adaptation paths and capabilities instead of content as in [RFC2703]. This invention also integrates this concept with existing Internet protocols, includes Adaptation Paths and integrates local as well as network resource reservation. This invention extends the work by first pre-negotiating several candidate QoS Contracts and configurations thus building a common vocabulary |
| [SDPNG00] together with [SDPCN00], [Ott99], [Beser00] | The mechanism proposed in this invention to perform endpoint capability negotiation and include user preferences and network resource reservation is based on this state of the art. [SDPCN00] adds SDP extensions for capability negotiation, only. [Ott99] only provides a notation for configuration description. [Beser00] only provides SDP extensions necessary for endpoints to negotiate codecs. This invention adds the negotiation protocol to determine a common set of configuration and integrates local, peer and network resource reservation by observing the Economy Principle. In addition, the invention integrates the process of referencing configurations by handles and builds upon QoS contracts. Also, this invention not only negotiates codecs, but also terminal capabilities and network resource reservation mechanisms. |
| [SIPRES01], together with [Cama00], [Cama00a] | The hereby-proposed invention is based on the integration of SIP/SDP with network resource reservation as a precondition. This invention extends the work by first pre-negotiating several candidate QoS Contracts and configurations thus building a common vocabulary. Also, only references to the configuration/QoS contract are referred to later on. In addition, this invention integrates local and peer resource management with the concept provided by this state of the art by observing the Economy Principle. This state of the art only covers one-to-one communication with resource reservation and does not cover joining operations performed during ongoing sessions with negotiations. |
| [Levin01] | The hereby-proposed invention fulfills many of the requirements stated in this state of the art. In addition, this invention provides the protocols and the mechanisms to integrate local, remote and network resource management into a coherent framework observing the Economy Principle. [Levin01] only provides requirements and no protocol or mechanisms to enforce the requirements. |

The invention claimed is:

1. A method for exchanging media streams between peers of a network, the method comprising:
pre-negotiating a common set of a plurality of indexed Quality-of-Service (QoS) contracts and terminal capabilities between peers, before streams are exchanged, wherein the pre-negotiating includes
forwarding, from an initiator peer, indexed QoS contracts and terminal capabilities to at least one responder peer;
generating, at the at least one responder peer, a common subset of said received indexed QoS contracts and its own QoS contracts and terminal capabilities; and
forwarding, from the at least one responder peer, the common subset to the initiator peer; and
negotiating, at the peers, QoS contracts on a per stream basis using the prenegotiated QoS contracts and terminal capabilities, at the time of stream establishment, wherein in case of a renegotiation during streaming, one of the peers sends the index of one of the indexed pre-negotiated QoS contracts and terminal capabilities to the other peers.

2. The method of claim 1, further comprising:
negotiating Quality-of-Service correlation and synchronization aspects among multiple streams among multiple peers.

3. The method of claim 1, wherein in case of a renegotiation during streaming the peers refer to a pre-negotiated state, and said state refers to a given pre-negotiated quality-of-service contract and a given pre-negotiated set of terminal capabilities.

4. The method of claim 1, wherein peers negotiate during pre-negotiation at the finest level of resolution, sets of quality-of-service contracts on a per-stream basis and/or on a per-stream-association basis, and said stream associations are bundles of streams from one sender peer to a receiver peer.

5. The method of claim 1, wherein peers are informed about changes in capability configuration.

6. The method of claim 1, wherein pre-negotiated alternative quality and configuration information of a given type of stream may already be available at a server for clients to choose from.

7. The method of claim 1, further comprising:
Protocol Discovery, Pre-Negotiation, optional Multi-Stream QoS Synchronization and QoS Correlation, Fast-Negotiation, renegotiation and Resource Reservation Release.

8. The method of claim 7, wherein all phases are concatenated and can be executed either continuously or at different times.

9. The method of claim 8, wherein the Multi-Stream QoS Synchronization and QoS Correlation phase is optional and required only if an Initiator communicate with multiple peers by using multiple streams, which need to be correlated and synchronized, based on user policies to be enforced at the Initiator side only.

10. The method of claim 9, wherein the Protocol Discovery and Pre-Negotiation phases are executed a priori, and the results can then be applied to multiple successive communication sessions, whereby each communication session is initiated with a specific optional Multi-Stream QoS Synchronization and QoS Correlation phase.

11. The method of claim 10, wherein, if the results of the Multi-Stream QoS Synchronization and QoS-Correlation phase are applicable to multiple successive communication sessions, each of said communication sessions can be initiated with a specific Fast Negotiation phase.

12. The method of claim 7, wherein the protocol interacts with Local resource management units during Pre-Negotiation, Multi-Stream QoS Synchronization and QoS Correlation, Fast Negotiation, renegotiation and Resource Release phases.

13. The method of claim 7, wherein a resource admission control and resource reservation are applied according to the following order:
at the initiator first,
then at the responder(s), and
finally for the network.

14. The method of claim 13, wherein local resource management tasks like real-time CPU scheduling, memory management, and power management are addressed before applying admission control and resource reservation for the network.

15. The method of claim 7, wherein for the resource release, first network resources, then peer and finally local resources are released.

16. The method of claim 7, wherein during runtime of a so established multimedia session, at any time any component of any peer may request an adaptation, thus eventually triggering a renegotiation.

17. The method of claim 7, further comprising:
pre-negotiation of the type of E2ENP during Protocol Discovery phase, either by forcing peers to query a Directory Server which may be implemented as a SIP registrar, or by having the peers announcing such information.

18. The method of claim 7, further comprising:
pre-negotiation of a complete codec list during the pre-negotiation phase.

19. The method of claim 7, further comprising:
pre-negotiation of adaptation paths at stream level during the Pre-Negotiation phase.

20. The method of claim 7, further comprising:
pre-negotiation of Adaptation Paths at stream aggregation level during Multi-Stream QoS Synchronization and QoS Correlation phase.

21. The method of claim 7, further comprising:
indexing pre-negotiated QoS Contracts and Capabilities for speeding up the Fast Negotiation phase.

22. The method of claim 7, further comprising:
indexing pre-negotiated QoS Contracts and Capabilities for speeding up the renegotiation.

23. The method of claim 7, further comprising:
handling installation/deinstallation of Capabilities even at runtime, by exchanging asynchronous messages among peers for notifying such events.

24. A peer, configured to exchange media streams with a plurality of other peers in a network, comprising:
a pre-negotiation unit configured to negotiate a common set of a plurality of indexed Quality-of-Service (QoS) contracts and terminal capabilities between peers, wherein the pre- negotiating unit is further configured to forward indexed QoS contracts and terminal capabilities to at least one of the plurality of other peers, and receive, from the at least one of the plurality of other peers, a generated common subset of said indexed QoS contracts and terminal capabilities of the at least one of the plurality of other peers;
a coordination unit configured to coordinate different phases of a negotiation process of a distributed resource management process; and
an establishment unit configured to negotiate QoS contracts on a per stream basis using the pre-negotiated QoS contracts and terminal capabilities at the time of stream establishment, wherein in case of a renegotiation during streaming, one of the peers sends the index of one of the pre-negotiated QoS contracts and terminal capabilities to the other peers.

25. The peer of claim 24, wherein the coordination unit is further configured to command a Protocol Discovery, and trigger/coordinate a:
Pre-Negotiation,
optional Multi-Stream QoS Synchronization and QoS Correlation,
Fast-Negotiation with Economy Principle,
Renegotiation with Economy Principle, and Resource Reservation Release phase.

26. The peer of claim 24, further comprising:
a protocol discovery unit configured to advertise and query information about an end-to-end negotiation protocol to be used.

27. The peer of claim 24, further comprising:
a session protocol unit configured to allow the coordination unit to carry out different phases of the coordination process with other peers.

28. The peer of claim 24, further comprising:
a plurality of interfaces configured to connect the coordination unit to local resource management units.

29. The peer of claim 24, further comprising:
a plurality of interfaces configured to connect the coordination unit to the protocol discovery unit.

30. The peer of claim 24, further comprising:
a plurality of interfaces configured to connect the coordination unit to the session protocol unit.

31. The peer of claim 24, further comprising:
a plurality of interfaces configured to connect the coordination unit to a FSM Engine Unit.

32. The peer of claim 24, further comprising:
a plurality of interfaces configured to connect the coordination unit to a network resource reservation unit.

33. A computer readable storage medium containing program instructions, which when executed by a processor, cause the computer to perform a method for exchanging media streams with a plurality of other peers in a network, said method comprising:
negotiating a common set of a plurality of indexed Quality-of-Service (QoS) contracts and terminal capabilities, wherein the pre-negotiating includes
forwarding indexed QoS contracts and terminal capabilities to at least one of the plurality of other peers; and
receiving, from the at least one of the plurality of other peers, a generated common subset of said indexed QoS contracts and terminal capabilities of the at least one of the plurality of other peers;
coordinating different phases of a negotiation process of a distributed resource management process; and
negotiating, at the peers, QoS contracts on a per stream basis using the pre-negotiated QoS contracts and terminal capabilities at the time of stream establishment, wherein in case of a renegotiation during streaming, one of the peers sends the index of one of the pre-negotiated QoS contracts and terminal capabilities to the other peers.

* * * * *